(12) United States Patent
Hornbuckle et al.

(10) Patent No.: US 7,848,367 B2
(45) Date of Patent: Dec. 7, 2010

(54) HIGHLY INTEGRATED, HIGH-SPEED, LOW-POWER SERDES AND SYSTEMS

(75) Inventors: Craig A. Hornbuckle, Torrance, CA (US); David A. Rowe, Torrance, CA (US); Thomas W. Krawczyk, Jr., Redondo Beach, CA (US); Samuel A. Steidl, Torrance, CA (US); Inho Kim, Palo Alto, CA (US)

(73) Assignee: Sierra Monolithics, Inc., Redondo Beach, CA (US)

( * ) Notice: Subject to any disclaimer, the term of this patent is extended or adjusted under 35 U.S.C. 154(b) by 410 days.

(21) Appl. No.: 11/896,162

(22) Filed: Aug. 30, 2007

(65) Prior Publication Data

US 2008/0037594 A1 Feb. 14, 2008

Related U.S. Application Data

(62) Division of application No. 10/338,972, filed on Jan. 10, 2003, now Pat. No. 7,286,572.

(51) Int. Cl.
*H04J 3/02* (2006.01)
(52) U.S. Cl. ...................... 370/537; 370/907
(58) Field of Classification Search ................ 370/503, 370/535, 537, 538, 539, 540, 907
See application file for complete search history.

(56) References Cited

U.S. PATENT DOCUMENTS

| 4,358,750 | A | * | 11/1982 | Webster ........................ 340/429 |
| 4,653,376 | A | * | 3/1987 | Allured et al. ................ 84/646 |
| 4,956,587 | A | * | 9/1990 | Kitou et al. .................. 315/408 |
| 6,192,069 | B1 | * | 2/2001 | Kubinec ...................... 375/220 |
| 6,243,388 | B1 | * | 6/2001 | Mussman et al. ........... 370/420 |
| 6,509,801 | B1 | | 1/2003 | Lao et al. |

(Continued)

OTHER PUBLICATIONS

Voegele et al, Serdes Framer Interface Level 4 (SFI-4) Phase 2: Implementation Agreement for 10Gb/s Interface for Physical Layer Devices, Sep. 12, 2002, http://www.oiforum.com/public/documents/OIF-SFI4-02.0.pdf, 31 pages.*

(Continued)

*Primary Examiner*—Ayaz R Sheikh
*Assistant Examiner*—Mounir Moutaouakil
(74) *Attorney, Agent, or Firm*—McDermott Will & Emery LLP

(57) ABSTRACT

High-speed, high-performance, low-power transponders, serializers and deserializers are disclosed. A serializer may include a serdes framer interface (SFI) circuit, a clock multiplier unit, and a multiplexing circuit. A deserializer may include an input receiver circuit for receiving and adjusting an input data signal, a clock and data recovery circuit (CDR) for recovering clock and data signals, a demultiplexing circuit for splitting one or more data channels into a higher number of data channels, and a serdes framer interface (SFI) circuit for generating a reference channel and generating output data channels to be sent to a framer. The input receiver circuit may include a limiting amplifier. Each of the serializer and deserializer may further include a pseudo random pattern generator and error checker unit. The serializer and deserializer each may be integrated into its respective semiconductor chip or both may be integrated into a single semiconductor chip.

14 Claims, 11 Drawing Sheets

U.S. PATENT DOCUMENTS

| | | | |
|---|---|---|---|
| 6,618,358 B2* | 9/2003 | Mahajan et al. | 370/242 |
| 7,286,572 B2 | 10/2007 | Hornbuckle et al. | |
| 2004/0047371 A1* | 3/2004 | Lentine et al. | 370/535 |
| 2004/0047637 A1* | 3/2004 | Wang et al. | 398/164 |
| 2004/0086278 A1* | 5/2004 | Proano et al. | 398/154 |
| 2004/0096013 A1* | 5/2004 | Laturell et al. | 375/316 |
| 2004/0208272 A1* | 10/2004 | Moursund et al. | 375/356 |

OTHER PUBLICATIONS

Dartnell et al, "Serdes Framer Interface Level 5 (SFI-5):Implementation Agreement for 40Gb/s Interface for Physical Layer Devices", www.oiforum.com, 62 pages, Jan. 29, 2002.*

Peter Dartnell, et al. (Physical and Link Layer (PLL) Working Group) "Serdes Framer Interface Level 5 (SFI-5): Implementation Agreement for 40Gb/s Interface for Physical Layer Devices." *Optical Internetworking Forum* /Implementation Agreement OIF-SF15-01.0 (Jan. 29, 2002).

Peter Dartnell, et al. (Physical and Link Layer (PLL) Working Group) "Serdes Framer Interface Level 5 (SFI-5): Implementation Agreement for 40Gb/s Interface for Physical Layer Devices." *Optical Internetworking Forum* / Document oif2001.145.10 Draft 5.3 (Jan. 29, 2002).

Thomas Palkert, et al. (Physical - Link (PLL))"SxI-5: Electrical Characteristics for 2.488-3.125Gbps Parallel interfaces." *Optical Networking Forum* / oif2001.149.13 (Jun. 5, 2002).

Karl Gass, et al. (Physical and Link Layer (PLL)) "System Packet Interface Level 5 (SPI-5): OC-768 System Interface for Physical and Link Layer Devices." *Optical Internetworking Forum* / Implementation Agreement : OIF-SPI5-01.1 (Sep. 2002).

Thomas Palkert, et al. (Physical—Link (PLL)) "System Interface Level 5 (Sxl-5): Common Electrical Characteristics for 2.488-3.125Gbps Parallel Interfaces" *Optical Networking Forum* / Implementation Agreement: OIF-SxI-5-01.0 (Oct. 2002).

* cited by examiner

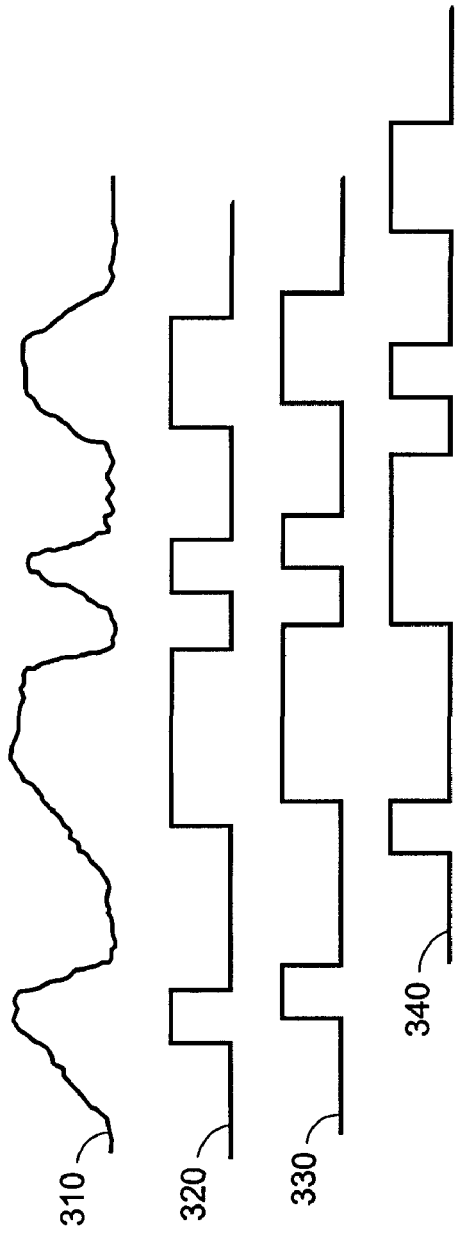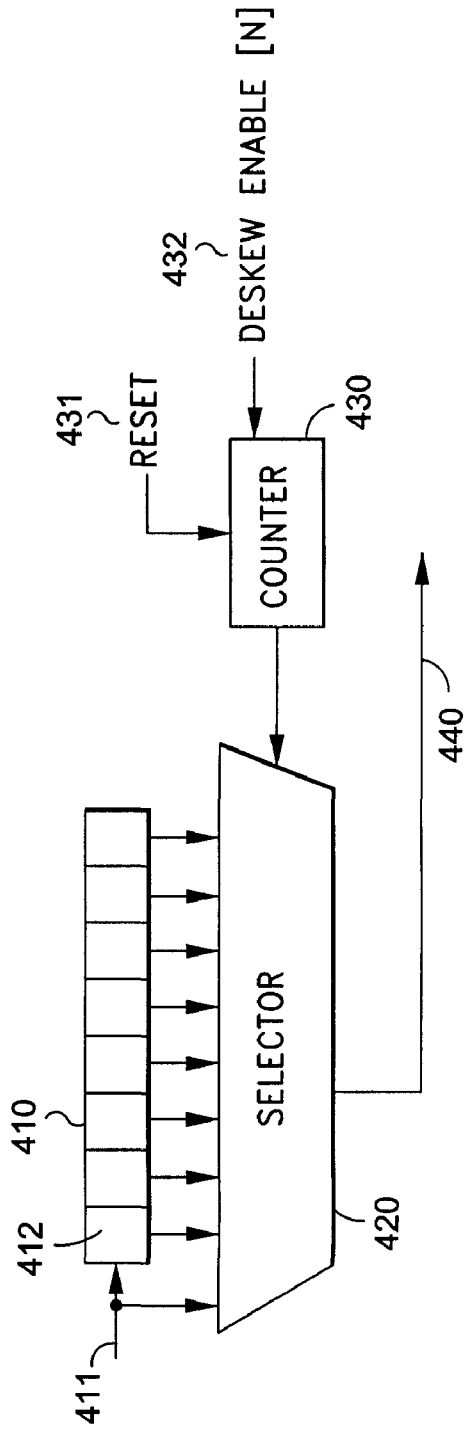

FIG. 9
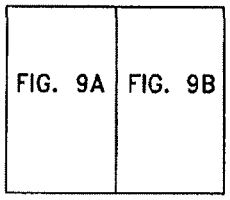
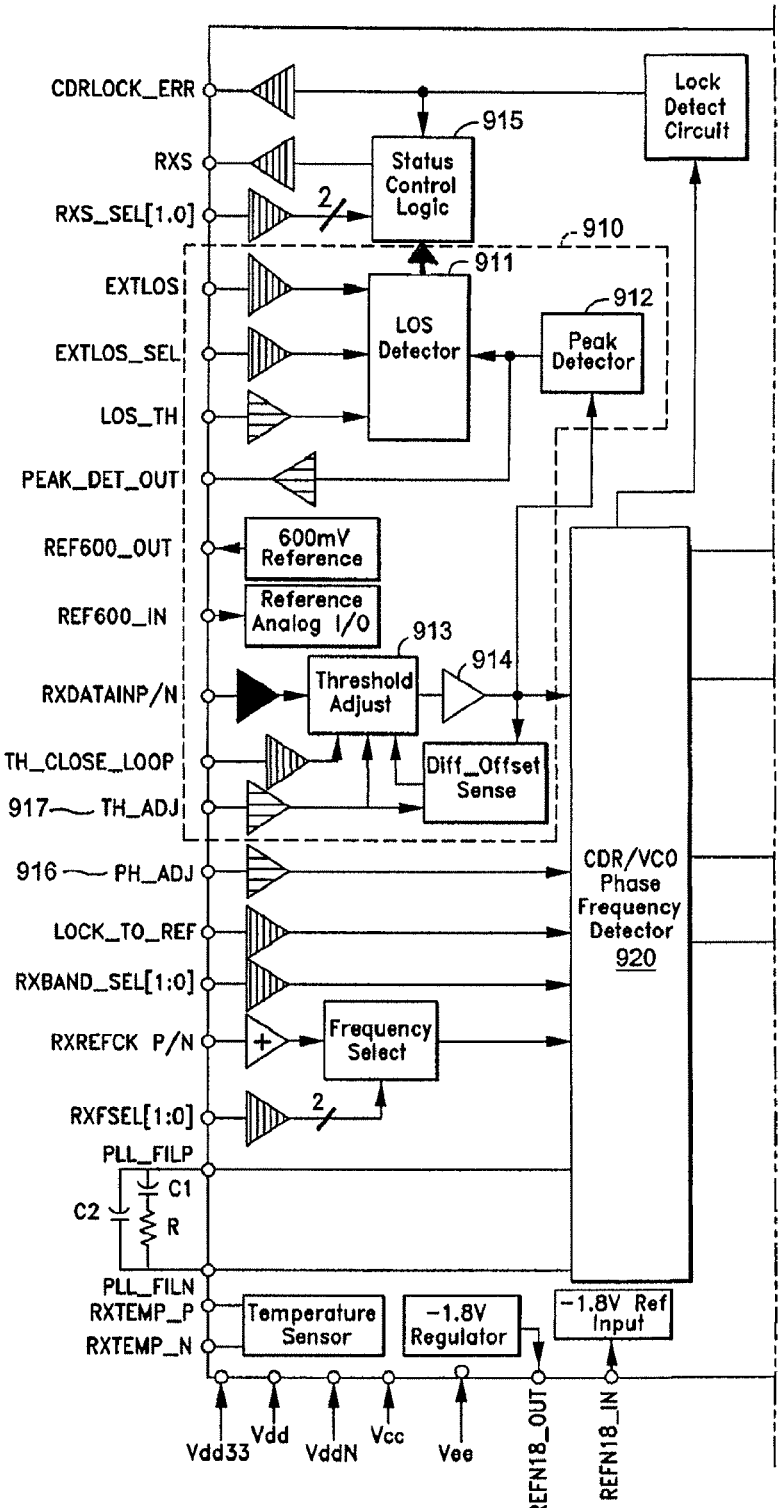
FIG. 9A

HIGHLY INTEGRATED, HIGH-SPEED, LOW-POWER SERDES AND SYSTEMS

CROSS-REFERENCE TO RELATED APPLICATION

This is a divisional application of U.S. patent application Ser. No. 10/338,972, filed Jan. 10, 2003, which is hereby incorporated herein by reference in its entirety for all purposes.

FIELD OF THE INVENTION

The present invention relates to communication devices, and more particularly relates to high-speed serializers and deserializers and related components for optical/electronic and wired/wireless communications.

BACKGROUND OF THE INVENTION

Recently, the world has witnessed a phenomenal growth in the number of Internet users, applications and devices and in the amount of data traffic especially that of medium-rich content—all demanding reliable high-speed, low-cost, low power consumption communication devices. The Internet utilizes fiber optic channels for ultra high speed communications. The optical signals sent along the fiber optic channels are received by receivers that include both optical components and electrical components. The receivers convert the optical signals to electrical signals and send the converted electrical signals to electronic computer networks operating at lower speeds for processing data. The transmitters, on the other hand, receive the electrical signals from electronic computer networks, convert them into optical signals and send them to the fiber optic channels.

These receivers and transmitters used in telecommunications applications may need to meet the optical standards that have emerged. One such standard is the Synchronous Optical Networks (SONET) which is a standard formulated by the Exchange Carriers Standards Association (ECSA) for the American National Standards Institute (ANSI). The SONET is used for telecommunications and other industries mainly in North America and Japan. Another standard is the Synchronous Digital Hierarchy (SDH) standard which was published by the International Telecommunication Union (ITU) and used in other parts of the world. The OC-192 SONET standard or STM64 SDH Standard is for speeds at about 9-13 Gbps depending on error correction coding, and the OC-768 SONET standard or STM 256 SDH Standard is for speeds at about 36 to 48 Gbps.

In 1998, an industry-wide initiative was announced to create the Optical Internetworking Forum (OIF), an open forum focused on fostering the development and deployment of interoperable products and services for data switching and routing using optical networking technologies. To accelerate the deployment of optical networking technology and facilitate industry convergence on interoperability, the OIF identified, selected, and augmented as appropriate and published optical internetworking standards. Information regarding the OIF and publications by the OIF can be found at the website of the OIF.

Accordingly, it would be desirable to be able to produce communication devices, and particularly serializers, deserializers, transmitters and receivers, that can satisfy the high-speed, high-performance, low-power communication needs demanded by the Internet and other multimedia communication applications while meeting the SONET/SDH standards and the OIF standards. It would be also desirable to produce such devices that are highly integrated and testable and cost-effective.

SUMMARY OF THE INVENTION

High-speed, high-performance, low-power transponders, serializers, deserializers and related components are disclosed. A transponder may include a transmitter and a receiver. In accordance with one embodiment of the present invention, a serializer may include (i) a serdes framer interface (SFI) circuit for receiving a first set of data channels and a reference channel from a framer and realigning the first set of data channels relative to a recovered reference channel, (ii) a clock multiplier unit (CMU) for receiving a clock frequency, translating the clock frequency to a higher clock frequency, and providing a clock signal to the SFI circuit, (iii) a multiplexing circuit for receiving a second set of data channels from the SFI circuit and merging the second set of data channels into one data channel, (iv) an output driver stage for translating the one data channel into an output data channel, (v) a reference selection circuit for selecting a reference clock, filtering the reference clock, and providing to the CMU one of the selected reference clock or a filtered reference clock.

In accordance with one embodiment of the present invention, a deserializer may include (i) an input receiver circuit for receiving an input data signal and adjusting the input data signal, (ii) a clock and data recovery circuit (CDR) for recovering clock and data signals, (iii) a demultiplexing circuit for receiving one or more data channels from the CDR and splitting the one or more data channels into a first set of data channels, (iv) a serdes framer interface (SFI) circuit for generating a reference channel, generating a second set of data channels based on the first set of data channels, and sending the second set of data channels and the reference channel to a framer. The input receiver circuit may include a limiting amplifier.

Each of the serializer and deserializer may further include a pseudo random pattern generator and error checker unit. A pseudo random pattern generator and error checker unit may include (i) a pseudo random pattern source (PRPS) capable of generating a $2^7-1$ pseudo random word sequence and a $2^{31}-1$ pseudo random word sequence, (ii) a word error checker coupled to the PRPS and for receiving (a) a first signal from the PRPS and (b) a second signal from one of the PRPS and data channels and comparing the first signal against the second signal, (iii) a pass-through circuit coupled to the PRPS and for coupling to the data channels and a static pattern source and for outputting a signal from one of the PRPS, the data channels and the static pattern source, and (iv) a lane error checker for coupling to the data channels and a reference channel and for selecting a channel from one of the data channels and the reference channel and checking for an error in the selected channel.

In accordance with one embodiment of the present invention, an output stage circuit may include (i) an input circuit having a pair of differential transistors, (ii) an output load, (iii) a current source/sink circuit, and (iv) a data pre-driver. The input of the data pre-driver is coupled to the current source/sink circuit, and the output is coupled to the input circuit. The data pre-driver monitors the voltage across the current source/sink circuit and adjusts its output in response to that voltage.

In one aspect of the disclosure, a serializer comprises a serdes framer interface (SFI) circuit, a clock multiplier unit (CMU), a multiplexing circuit, an output driver stage, and a reference selection circuit. The SFI circuit is configured for recovering a first set of data channels and a reference channel and for realigning the first set of data channels relative to a reference channel to create a second set of data channels. The CMU is coupled to the SFI circuit, and is configured for receiving a clock frequency, for translating the clock frequency to a higher clock frequency, and for providing a clock signal to the SFI circuit. The multiplexing circuit is coupled to the CMU, and is configured for receiving the second set of data channels and for merging the second set of data channels into one data channel. The output driver stage is coupled to the multiplexing circuit, and is configured for translating the one data channel into an output data channel. The reference selection circuit is coupled to the CMU, and is configured for selecting a reference clock, for filtering the reference clock, and for providing to the CMU one of the selected reference clock or a filtered reference clock. A data rate of the one data channel is higher than a data rate of the second set of data channels.

In another aspect of the disclosure, a deserializer comprises an input receiver circuit, a clock and data recovery circuit (CDR), a demultiplexing circuit, and a serdes framer interface (SFI) circuit. The input receiver circuit is configured for receiving an input data signal and for adjusting the input data signal. The CDR is coupled to the input receiver circuit, and is configured for recovering clock and data signals. The demultiplexing circuit is coupled to the CDR, and is configured for receiving one or more data channels from the CDR and splitting the one or more data channels into a first set of data channels. The SFI circuit is coupled to the demultiplexing circuit, and is configured for generating a reference channel, for generating a second set of data channels based on the first set of data channels, and for sending the second set of data channels and the reference channel to a framer. The one or more data channels have less number of channels than the first set of data channels. A data rate of the one or more data channels is higher than a data rate of the first set of data channels.

In yet another aspect of the disclosure, a pattern generation and error detecting circuit comprises a pseudo random pattern source (PRPS), an error checker, and a pass-through circuit coupled to the PRPS. The error checker is coupled to the PRPS, and is configured for receiving (a) a first signal from the PRPS and (b) a second signal from one of the PRPS and data channels. The error checker is also configured for comparing the first signal against the second signal. The pass-through circuit is coupled to the PRPS, and is configured for coupling to the data channels and for outputting a signal from one of the PRPS and the data channels.

In yet another aspect of the disclosure, an error detecting circuit comprises a first error checker and a second error checker. The first error checker is configured for performing a word error checking on multiple channels. The second error checker is configured for selecting a channel from multiple channels and checking for an error in the selected individual channel.

In yet another aspect of the disclosure, an error detecting circuit comprises a pseudo random pattern source (PRPS) and an error checker. The error checker is coupled to the PRPS, and is configured for receiving (a) a first signal from the PRPS and (b) a second signal from one of the PRPS and a plurality of data. The error checker is further configured for comparing the first signal against the first signal when the error checker operates in a self-test mode. The error checker is further configured for comparing the first signal against the plurality of data when the error checker operates in a non-self-test mode.

In yet another aspect of the disclosure, an output stage circuit comprises an input circuit, an output load, a current source/sink circuit, and a data pre-driver. The output load is coupled to the input circuit and a first voltage supply connection. The current source/sink circuit is coupled to the input circuit and a second voltage supply connection. The data pre-driver has an input and an output. The output is coupled to the input circuit. The input is coupled to the current source/sink circuit. The data pre-driver is configured for monitoring a voltage across the current source/sink circuit and for adjusting the output in response to the voltage.

In yet another aspect of the disclosure, an integrated circuit comprises a serdes framer interface (SFI) circuit and a multiplexing circuit. The SFI circuit is configured for receiving a first set of data channels and a reference channel, generating first logic levels for the first set of data channels, and realigning the first set of data channels relative to a reference channel. The multiplexing circuit is coupled to the SFI circuit, and is configured for receiving a second set of data channels and for merging the second set of data channels into one or more data channels. The second set of data channels is generated based on the first set of data channels. A data rate of the one or more data channels is higher than a data rate of the second set of data channels. The one or more data channels have less number of channels than the second set of data channels. The SFI circuit and the multiplexing circuit are integrated into one semiconductor chip.

In yet another aspect of the disclosure, an integrated circuit comprises a demultiplexing circuit and a serdes framer interface (SFI) circuit. The demultiplexing, circuit is configured for receiving one or more data channels and splitting the one or more data channels into a first set of data channels. The SFI circuit is coupled to the demultiplexing circuit, and is configured for generating a reference channel, for generating a second set of data channels based on the first set of data channels, and for sending the second set of data channels and the reference channel to a framer. The one or more data channels have less number of channels than the first set of data channels. A data rate of the one or more data channels is higher than a data rate of the first set of data channels. The demultiplexing circuit and the SFI circuit are integrated into one semiconductor chip.

In yet another aspect of the disclosure, a transponder integrated circuit comprises a transmit serdes framer interface (TSFI) circuit and a receive serdes framer interface (RSFI) circuit. The TSFI circuit is configured for receiving a first set of data channels and a first reference channel from a framer and for realigning the first set of data channels relative to a reference channel. The RSFI circuit is configured for generating a second reference channel, for generating a second set of data channels, and for sending the second set of data channels and the reference channel to a framer. The TSFI circuit and the RSFI circuit are integrated into one semiconductor chip.

In yet another aspect of the disclosure, a transponder integrated circuit comprises a clock multiplier circuit (CMU), a multiplexing circuit, a clock and data recovery circuit (CDR), and a demultiplexing circuit. The CMU is configured for receiving a clock frequency and for translating the clock frequency to a higher clock frequency. The multiplexing circuit is coupled to the CMU, and is configured for receiving a first set of data channels and for merging the first set of data channels into first one or more data channels. The CDR is configured for receiving and recovering clock and data signals. The demultiplexing circuit is coupled to the CDR, and is configured for receiving second one or more data channels from the data signal and splitting the second one or more data channels into a second set of data channels. A data rate of the first one or more data channels is higher than a data rate of the first set of data channels. The first one or more data channels have less number of channels than the first set of data channels. A data rate of the second one or more data channels is higher than a data rate of the second set of data channels. The second one or more data channels have less number of channels than the second set of data channels. The CMU, the multiplexing circuit, the CDR and the demultiplexing circuit are integrated into one semiconductor chip.

In yet another aspect of the disclosure, a transponder integrated circuit comprises a multiplexing circuit and a demultiplexing circuit. The multiplexing circuit is configured for receiving a first plurality of signal channels and for merging the first plurality of signal channels into a first signal channel. The demultiplexing circuit is configured for receiving a second signal channel and for splitting the second signal channel into a second plurality of signal channels. A data rate of the first signal channel is higher than a data rate of the first plurality of signal channels. A data rate of the second signal channel is higher than a data rate of the second plurality of signal channels. The multiplexing circuit and the demultiplexing circuit are integrated into one semiconductor chip. A data rate of the first signal channel is greater than 20 Gbps.

In yet another aspect of the disclosure, a serdes framer interface circuit comprises a data recovery circuit (DR), a synchronizing circuit, a deskew circuit, and a first controller. The DR is configured for recovering data. The synchronizing circuit is coupled to the DR. The deskew circuit is coupled to the synchronizing circuit, and is configured for generating deskewed data channels. The first controller is coupled to the deskew circuit, and is configured for controlling the deskew circuit and for receiving the deskewed data channels.

In yet another aspect of the disclosure, a serdes framer interface circuit comprises a data recovery circuit (DR), a synchronizing circuit, a deskew circuit, and a first controller. The DR is configured for recovering data, for coupling to a clock multiplier unit, and for selectively receiving (i) a clock signal generated based on a data clock or (ii) a clock signal generated by the clock multiplier unit. The synchronizing circuit is coupled to the DR, and is configured for receiving the clock signal generated by the clock multiplier unit. The deskew circuit is coupled to the synchronizing circuit, and is configured for generating deskewed data channels and receiving the clock signal generated by the clock multiplier unit. The first controller is coupled to the deskew circuit, and is configured for controlling the deskew circuit.

A serializer, deserializer and related components may be, in various combination forms, integrated into a single semiconductor chip.

BRIEF DESCRIPTION OF THE DRAWINGS

FIG. 3 illustrates exemplary waveforms of signals at various stages of a serializer.

FIG. 4 is a simplified diagram of a deskew register array in accordance with one embodiment of the present invention.

DETAILED DESCRIPTION OF THE INVENTION

The present invention provides novel communication devices, and more particularly high-performance serializers, deserializers, and related components, that are highly integrated and testable and low in power consumption and cost. In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail so as to avoid unnecessarily obscuring the present invention.

For clarity, some of the terms used to describe the present invention are defined as follows:

"Serdes" means a serializer and deserializer.

"Skew" means the constant portion of the difference in the arrival time between the data of any two in band signals.

"SFI" means the Serdes Framer Interface.

"SFI-5" means the Serdes Framer Interface Level 5 for the OC-768 system interface for physical layer devices. Documents relating to SFI-5 may include OIF2001.145.10, OIF2001.149.13, Implementation Agreement OIF-SFI5-01.0, and Implementation Agreement OIF-SPI5-01.1. The last two documents are available on the internet at the website of the OIF.

"Unit Interval" means one nominal bit period for a given speed. It is equivalent to the shortest nominal time between signal transitions.

"Wander" means the peak-to-peak variation in the phase of a signal (clock or data) after filtering the phase with a single pole low pass filter with the −3 db point at the wander corner frequency.

Figure 1:
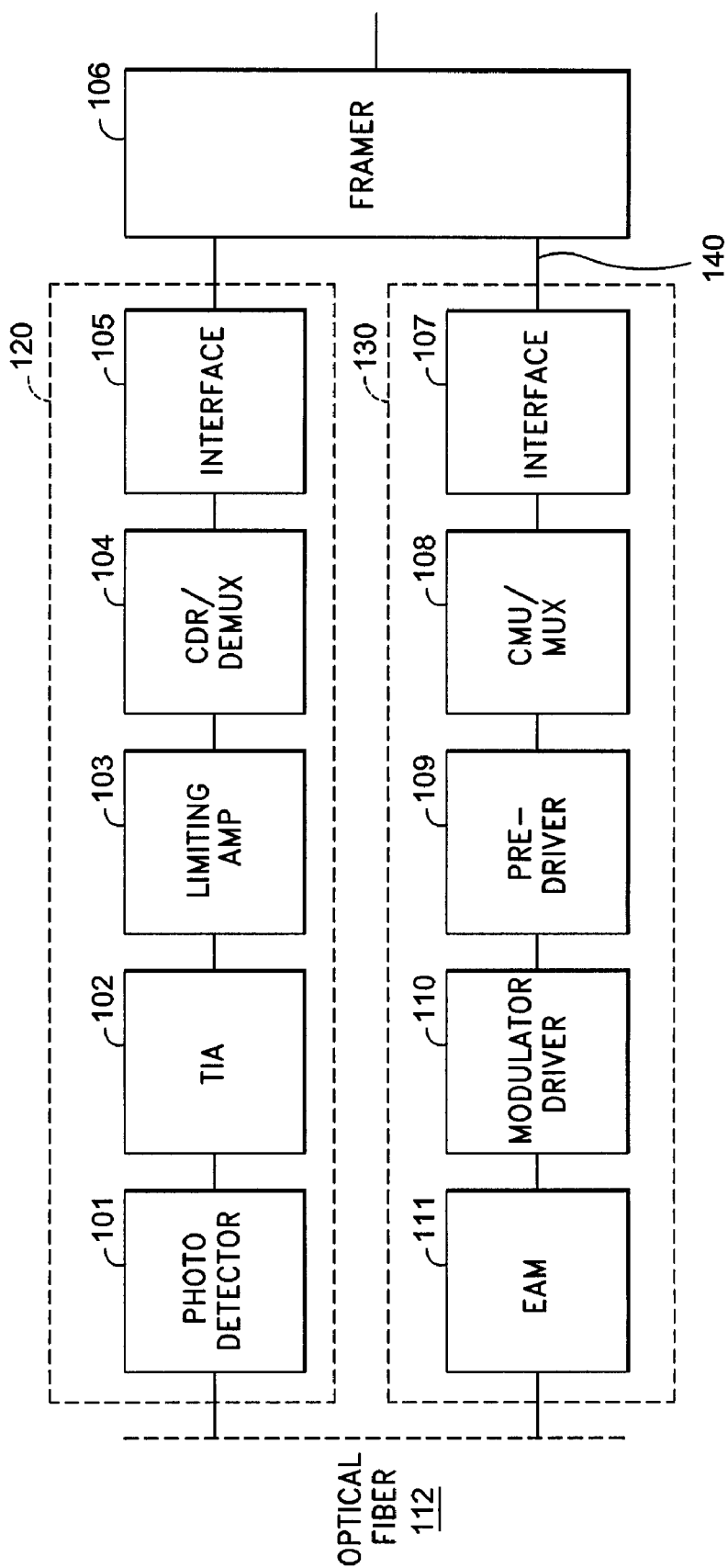
FIG. 1 illustrates a simplified diagram of a transmitter and a receiver.

Now referring to FIG. 1, a simplified diagram of a transponder is illustrated. A transponder may include a transmitter 130 and a receiver 120. On the transmitting side, electrical signals may be sent from a framer 106 to transmitter 130 which converts parallel data streams into a serial data stream and converts electrical signals to optical signals to be transmitted over optical fibers 112. On the receiving side, optical signals received from optical fibers 112 may be sent to receiver 120 which converts the optical signals to electrical signals and converts a serial data stream into parallel data streams. The output signals from receiver 120 may be sent to framer 106.

In accordance with one embodiment of the present invention, transmitter 130 may include (i) an interface stage 107 (e.g., a Transmit SFI-5 interface for the OC-768 system), (ii) a clock multiplier unit (CMU) and multiplexer (MUX) 108, (iii) a pre-driver 109, (iv) a modulator driver 110, and (v) an eletroabsorption modulator (EAM) 111. In accordance with one embodiment of the present invention, a Transmit SFI-5 interface 107 may receive multiple data channels (e.g., sixteen data channels from framer 106) and convert them into standard digital logic levels. Transmit SFI-5 interface 107 may derive a clock from the signals received from framer 106 and realign the data channels. CMU/MUX 108 receives the sixteen realigned data channels and multiplexes them up to a serial data channel. Transmitter 130 may include pre-driver 109 that can produce an output at an intermediate level (e.g., about 1.2V peak-to-peak). Modulator driver 110 boosts the intermediate level output signal to a higher level (e.g., about 3V peak-to-peak single ended signal) to drive the EAM which produces optical signals to be transmitted over optical fibers 112. It should be noted that in another embodiment, some of the components may be combined or divided into separate parts, or eliminated.

In accordance with one embodiment of the present invention, receiver 120 may include (i) a photo detector 101, (ii) a trans-impedance amplifier (TIA) 102, (iii) a limiting amplifier 103, (iv) a clock and data recovery (CDR) unit and demultiplexer (Demux) 104, and (v) an interface stage 105 (e.g., a Receive SFI-5 interface). The optical signals sent along the optical fibers are detected and received by photo detector 101 and TIA 102. After photo detector 101 converts the optical signals to electrical current signals, TIA 102 converts the electrical current signals into electrical voltage signals and may amplify the signals at the same time. Limiting amplifier 103 may take an input with varying input voltages and convert it to a single high or low level. It makes amplitude decisions. CDR/Demux 104 may sample the data, quantize it in time and amplitude, and demultiplex it. It recovers the clock and data signals. The Demux may convert a serial data stream into parallel data streams. The CDR can perform with or without the limiting amplifier. If it receives an analog input that has not been operated on by a limiting amplifier, the sampler in the CDR can work at varying levels. Receive SFI-5 interface 105 may generate a reference channel and buffer the data so that the output data will be compatible with the logic and impedance levels and other characteristics required by the interface between receiver 120 and framer 106. It should be noted that in another embodiment, some of the components may be combined or divided into separate parts, and/or eliminated.

Various components may be integrated into one single semiconductor chip. For the transmitter side, in accordance with one embodiment, interface stage 107 and CMU/Mux 108 may be integrated into one single semiconductor chip. In another embodiment, interface stage 107, CMU/Mux 108 and pre-driver 109 may be integrated into one single semiconductor chip. Yet in another embodiment, pre-driver 109 and CMU/Mux 108 may be integrated into one semiconductor chip. In another embodiment, interface stage 107, CMU/Mux 108, pre-driver 109 and modulator driver 110 may be integrated into one single semiconductor chip. In another example, CMU/Mux 108, pre-driver 109 and modulator driver 110 may be integrated into one single semiconductor chip. It should be noted that CMU/Mux 108 may be divided into CMU and Mux, and depending on the application, the Mux may be integrated with various components as described above.

On the receiver side, in accordance with one embodiment, CDR/Demux 104 and interface stage 105 may be integrated into one semiconductor chip. In another embodiment, limiting amplifier 103, CDR/Demux 104 and interface stage 105 may be integrated into one single semiconductor chip. Yet in another embodiment, limiting amplifier 103 and CDR/Demux 104 may be integrated into one single semiconductor chip. In another embodiment, TIA 102, limiting amplifier 103, CDR/Demux 104 and interface stage 105 may be integrated into one single semiconductor chip. In another example, TIA 102, limiting amplifier 103, and CDR/Demux 104 may be integrated into one single semiconductor chip. It should be noted that CDR/Demux 104 may be divided into CDR and Demux, and depending on the application, only CDR or only Demux may be integrated with various components as described above.

For transponders, other integration methods may be possible. For instance, CMU/Mux 108 and CDR/Demux 104 may be integrated into one semiconductor chip with or without pre-driver 109 and limiting amplifier 103. In another example, interfaces 107 and 105, CMU/Mux 108 and CDR/Demux 104 may be integrated into one semiconductor chip with or without pre-driver 109 and limiting amplifier 103. Yet another example may integrate TIA 102, limiting amplifier 103, CDR/Demux 104, modulator 110, pre-driver 109 and CMU/Mux 108 into one chip or die. In another embodiment, TIA 102, limiting amplifier 103, CDR/Demux 104, interface stage 105, modulator 110, pre-driver 109, CMU/Mux 108 and interface stage 107 may be integrated into one chip.

To produce a highly integrated chip, it will be helpful to utilize a fabrication process that can provide good yield and small geometry and high speed devices. For instance, SiGe BiCMOS may be utilized, but the fabrication process is not limited to SiGe BiCMOS. To integrate various components into a chip, it may be beneficial, by way of example and not by way of limitation, to provide differential input/output lines to various components (for example, to provide field cancellation), a flip-chip configuration (e.g., Ball Grid Array), isolation trenches, and low temperature ceramic packages. If EAM 111 includes differential inputs rather than a single ended input, it will reduce the required single-ended output voltage level at the stage prior to EAM 111 to one-half of the voltage required for a single ended input. This also helps integration. Providing balanced differential photo detectors or photo diodes will be also helpful.

Figure 2A:
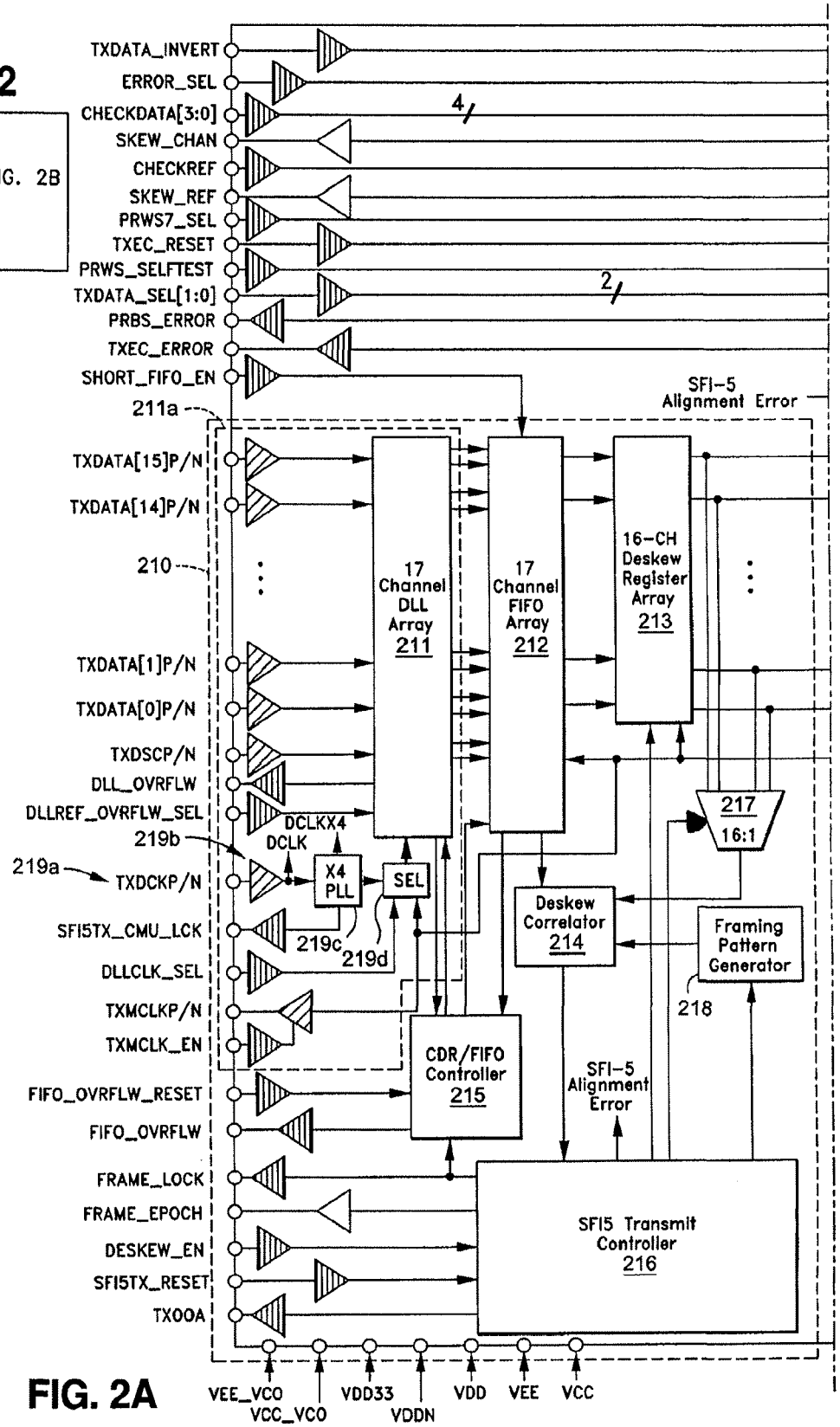
FIG. 2 is a simplified diagram of a serializer in accordance with one embodiment of the present invention.
Figure 2B:
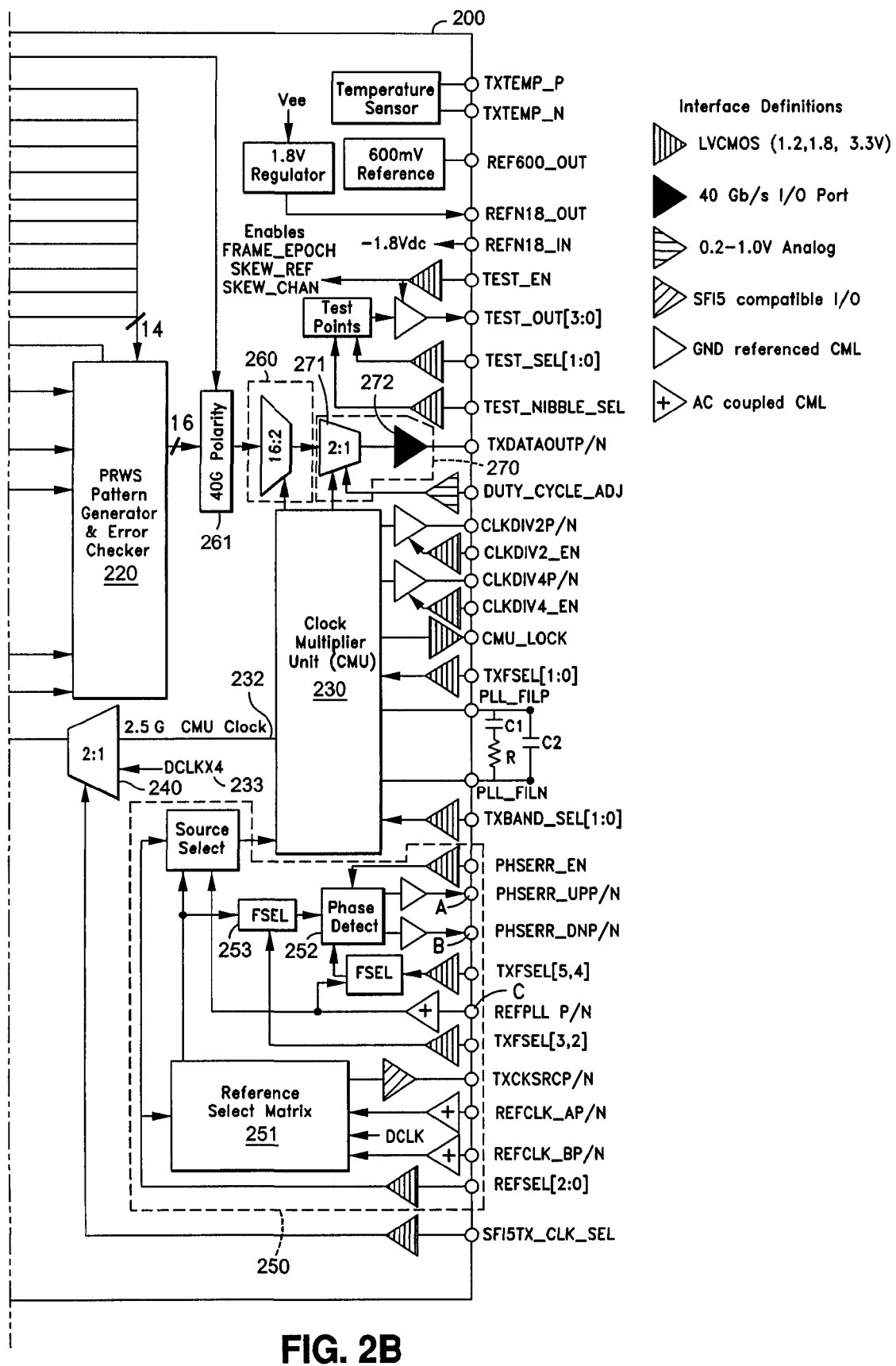

Now referring to FIG. 2, a simplified diagram of a serializer is shown in accordance with one embodiment of the present invention. The term serializer may be used to refer to, by way of example and not by way of limitation, (i) a multiplexer, (ii) a combination of a clock multiplier unit and a multiplexer unit, (iii) more broadly, a combination of an interface unit, a clock multiplier unit, and a multiplexer unit, or (iv) even more broadly, a combination of an interface unit, a clock multiplier unit, a multiplexer unit and a pre-driver unit.

In FIG. 2, a serializer chip may include, by way of example and not by way of limitation, the following features in accordance with one embodiment of the present invention:
 SONET OC-768 16:1 Multiplexer/CMU
 Wide Range of Operation: From 39.8 to 43.5 Gbps
 SFI-5 Compliant Input Data & Clock
 SFI-5 Compliant FIFO and Deskew functions
 CML-Compatible High-Speed Differential Output
 High-Speed Clock Outputs with Data Excellent Phase Tracking and Low Phase Noise
  User-Enabled Half-Rate Clock Output (20 GHz nominal)
  User-Enabled Quarter-Rate Clock Output (10 GHz nominal)
 SONET-compliant on-chip Clock Multiplier Unit (CMU) with VCO
 Three User Selectable Reference Clock Input Ports
  Each with independently selectable frequencies: 622, 1244, or 2488 MHz Reference Clock Clean-Up Loop Phase Detector
On-Chip Dual-Mode PRWS Error Checker and Pattern Generator: $2^7-1$ and $2^{31}-1$ patterns
Transmit Out-of-Alignment Alarm (TXOOA)
Reverse Clock Output (TXREFCKSRC)
Temperature Sense Output Voltage
Low Power Consumption: 3.5 Watts (typical)

In accordance with one embodiment of the present invention, the SONET OC-768 compatible serializer may convert sixteen SFI-5 compatible parallel inputs at a nominal rate of 2.488 Gbps into a 39.81 Gbps serial data stream. The serializer may support, by way of example and not by way of limitation, rates as high as 2.72 Gbps on the input ports and 43.5 Gbps at the output. The data and clock input interface may be compliant with the SFI-5 standard defined in OIF2001.145.10 and OIF2001.149.13. User-enabled half-rate (CLKDIV2P/N, e.g., 19.91 to 21.75 GHz) and quarter-rate clock (CLKDIV4P/N, e.g., 9.953 to 10.875 GHz) outputs derived from the on-chip Clock Multiplier Circuit (CMU) may be available. These high-speed clock signals may exhibit excellent phase tracking with respect to the data outputs and have very low phase noise enabling a host system to re-clock the 40 Gbps serial signal prior to modulation for reduced deterministic jitter.

In accordance with one embodiment of the present invention, a pseudo random word sequence (PRWS) generator and error checker subsystem may be provided featuring two user-selectable PRBS codes: $2^7-1$ and $2^{31}-1$, each at serial interface rate. Bit error checking may be performed, independent of the pattern generator function, on the input parallel data channels either singly or as a complete group. Also included may be an alternating 1,0,1,0 pattern generator facilitating random jitter generation testing. As with all of the digital control interfaces on this chip, configuration of the pattern generator and error checker subsystem may be achieved through LVCMOS logic interfaces. Compatibility with a wide range of logic families may be possible through application of 1.2V, 1.8V, or 3.3V at the Vdd33 supply voltage input.

In accordance with one embodiment of the present invention, a clock multiplier unit (CMU) may lock to any of four user-selectable reference signals: REFCLK_AP/N, REFCLK_BP/N, the input data clock DCLK, or a filtered version of any of these three injected at the REFPLLP/N input port. With the exception of the data clock which operates consistent with the SFI-5 interface standard, any of these reference clock signals may be operated at any of three selectable frequencies: $\frac{1}{64}^{th}$, $\frac{1}{32}^{nd}$, or $\frac{1}{16}^{th}$ of the serial input rate. Filtering of the reference clock input signals is achieved through use of a phase lock loop consisting of a user-enabled on-chip phase/frequency detector and an off-chip loop filter and precision VCO. The phase/frequency detector for the clean-up PLL locks the off-chip VCO, connected to the REFPLLP/N input port, to the user-selected reference source in a narrowband PLL. This mode of operation is very useful in transponder applications requiring compliance with the SONET jitter transfer mask and is useful for improving the CMU's random jitter performance in most applications where the transmitters REFCLK input signal has high levels of phase noise. The selected reference signal is buffered and provided at the SFI-5 compliant TXCKSRCP/N output.

In accordance with one embodiment of the present invention, the seventeen data and reference (TXDSC) input channels may be recovered using per-channel dedicated CDR's employing delay lock loop (DLL) or VCO-based implementations. The reconstructed data and clock channels from the DLLs may be latched into a FIFO array (e.g., 24 or 36 deep) featuring overflow detection. A deskew processor may determine the timing relationships of the data channels as they appear at the output of the deskew register array 213 relative to the recovered reference channel, as provided from the FIFO array 212 and align the channels appropriately. Successful operation of the deskew subsystem is indicated by a logic-low at the Transmit Out of Alignment (TXOOA) indicator. The deskewed data channels may be provided to a PRWS pattern generator and error checker allowing insertion of a user-selectable PRWS/PRBS code.

The output of the PRWS pattern generator and error checker may be provided to a bit inversion array allowing the user to invert the serial data stream output using the TXDATA_INVERT LVCMOS control signal. The sixteen data channels from the inverter array may be provided to a 16:2 multiplexer that provides the input to the driver circuitry. The driver circuit may consist of a 2:1 multiplexer and a CML driver output stage generating a nominal output voltage swing of 1.2 Vp-p (TXDATAOUTP/N). Typical 20-80%/80-20% rise/fall times for the TXDATAOUTP/N differential pair are 10 psec. The 10 GHz and 20 GHz clock outputs (CLKDIV2P/N and CLKDIV4P/N, respectively) are ground-referenced CML and have nominal differential output voltage swings of 1.6 Vp-p. These outputs may be individually activated through dedicated LVCMOS control lines.

In accordance with one embodiment of the present invention, there may be three power supplies required for a serializer although Vdd and Vdd33 may share the same supply. All of the high-speed logic may be powered from the Vee supply (−3.6V nominal). The CMOS functions may derive power from the Vee supply by internally regulating it to a nominal voltage of −1.8 Vdc. SFI-5 receivers and drivers may be powered from the Vdd supply operating at a nominal voltage of 1.2 Vdc. Alternatively, for ac-coupled operation on the SFI5 interfaces, the Vdd power supply may be set to 1.8 Vdc. A serializer chip may be packaged into, by way of example and not by way of limitation, a 5000 microns (length) by 5000 microns (width) by 500 microns (thickness) die.

In FIG. 2, in accordance with one embodiment of the present invention, a serializer 200 may be an integrated circuit (e.g., one semiconductor chip), including an interface block 210, a pattern generation and error detecting block 220, a clock multiplier unit (CMU) 230, a clock selector 240, a reference selector 250, a bit inversion block 261, a multiplexer (Mux) 260, and a pre-driver 270. In this example, interface block 210 may be a Transmit SFI-5 interface circuit.

Interface block 210 may include a clock and data recovery circuit (CDR) 211a, a first-in-first-out circuit (FIFO) 212, a CDR/FIFO controller 215, and a deskew circuit including a deskew register array 213, an SFI-5 transmit controller 216, a deskew correlator 214, a framing pattern generator 218, and a data selector 217. A serializer may also include a word reorder (not shown in FIG. 2). Deskew register array 213, SFI-5 transmit controller 216, deskew correlator 214 and data selector 217 may run synchronously with a local clock (e.g., a local clock 232 coming out of CMU 230).

Still referring to FIG. 2, CDR 211a may include (i) a clock recovery unit (219b, 219c, 219d) for recovering a clock and (ii) a data recovery array (DLL) 211 for recovering the sixteen data lanes as well as the reference (TXDSCP/N) lane. TXDCKP/N 219a may be a transmit data clock signal received from a framer. It may provide timing reference for the transmitting data path signals such as TXDATA[n]P/N and TXDSCP/N. In this example, DLL 211 receives 16 data channels (TXDATA[15]P/N through TXDATA[0]P/N) and a reference channel TXDSCP/N. DLL 211 outputs multiple (e.g., 17) parallel clock and data pairs. CDR/FIFO controller 215 controls DLL 211.

In FIG. 2, FIFO 212 receives multiple (e.g., 17) clock and data pairs from DLL 211. Each channel is an independent channel. FIFO 212's function is to synchronize each clock and data pair to a local clock. FIFO 212 performs sub-bit deskew—i.e., it aligns each clock and data signal to the nearest clock edge of the local clock as provided by clock selector 240. FIFO 212 may advance or retard the clock/data up to a half-bit to align it to the local clock. In addition, while the system is running, FIFO 212 may perform wander tracking—e.g., as the data moves relative to the local clock, FIFO 212 tracks the movement, and the degree in which FIFO 212 tracks the movement depends on the depth of the FIFO.

FIG. 3 illustrates exemplary waveforms of a data channel and a reference channel in accordance with one embodiment of the present invention. Signal 310 is an exemplary waveform of an incoming data channel TXDATA[N]P/N. When the signals come out of framer 106 in FIG. 1, they are aligned to the framer's internal master clock, but as they cross the connections (e.g., 140 in FIG. 1), the signals become misaligned, noisy, corrupted and degraded (e.g., signal 310 in FIG. 3). Referring back to FIG. 3, signal 320 may be a data channel coming out of DLL 211. Signal 330 may be a data channel coming out of FIFO 212. At this point, signal 330 is aligned to the local clock from clock selector 240. Signal 340 may be a reference channel coming out of FIFO 212. The reference channel comes out of FIFO 212 either earlier, on time with, or later than the data channels (e.g., three bits later in this example).

A reference channel is typically created by a framer. A framer such as framer 106 typically sends, among others, (i) one original data (e.g., TXDATA[15]P/N through TXDATA[0]P/N) and (ii) a reference channel (e.g., TXDSCP/N). A reference channel typically contains a framing pattern, an expansion header pattern and a copy of the data. The framing pattern is a unique pattern. The expansion header pattern may be, by way of example and not by way of limitation, an alternating sequence of 1 0 1 0 1 0. The construction of the reference channel (TXDSCP/N) is described in oif2001.145.10. The reference channel may be used to align the data channels as described more fully below.

Referring back to FIG. 2, deskew register array 213 may receive multiple (e.g., 16) data channels from FIFO 212. While the data channels coming out of FIFO 212 may be aligned to the local clock, they are not necessarily aligned relative to each other. They may be off by, for example, 0-7 unit intervals apart from each other. The deskew circuit performs integer bit deskew as compared to sub-bit deskew done by FIFO 212. The deskew circuitry consisting of 213, 214, 216, 217, and 218 may implement unit interval delays in the data channels as provided by the FIFO array 212. Deskew register array 213 may be an array that consists of, for example, 16 identical blocks. One such block is shown in FIG. 4.

Now referring to FIG. 4, in accordance with one embodiment of the present invention, each block in deskew register array 213 may include a multiple-bit shift register 410, a data selector 420, and a counter 430. In this example, register 410 includes 8 bits, and counter 430 is an 9-bit ring counter. In general, register 410 may be N-bits whereas counter 430 would then be N+1 bits. A signal coming out of FIFO 212 (e.g., signal 330 in FIG. 3) may enter a block in deskew register array 213 as an input signal 411 in FIG. 4. An output signal 440 is a delayed copy of the incoming signal. The delay depends on the selection made by data selector 420. The position of data selector 420 is controlled by counter 430, which may be advanced or retarded using a Deskew Enable command [N] 432. Deskew Enable command [N] 432 is provided by SFI-5 transmit controller 216 in FIG. 2. By adjusting the position of each of the counters (430 in FIG. 4) in the deskew register array 213, the selected data out of each block of deskew register array 213 may be changed, and the deskew requirement of, for example, 6.3 Unit Interval maximum can be satisfied with margin.

Referring back to FIG. 2, in accordance with one embodiment of the present invention, deskew correlator 214 may receive a reference channel output from FIFO 212 and successively correlate the digital signal with the 64 bit samples from the 16 data channels. This process is controlled by SFI-5 transmit controller 216. Once the reference channel's framer pattern is detected, SFI-5 transmit controller 216 is initialized. The presence of a valid framer pattern, occurring in the expected location for the next two reference channel frames results in SFI-5 frame synchronization of the SFI-5 transmit controller 216. When SFI-5 transmit controller 216 is synchronized, the FRAME_LOCK signal is placed in its logic-high state. Data selector 217, connected to the output of the 16 data channels from deskew register array 213, is then sequentially cycled through the various data channels dwelling on each for 64 bit periods.

Figure 5:
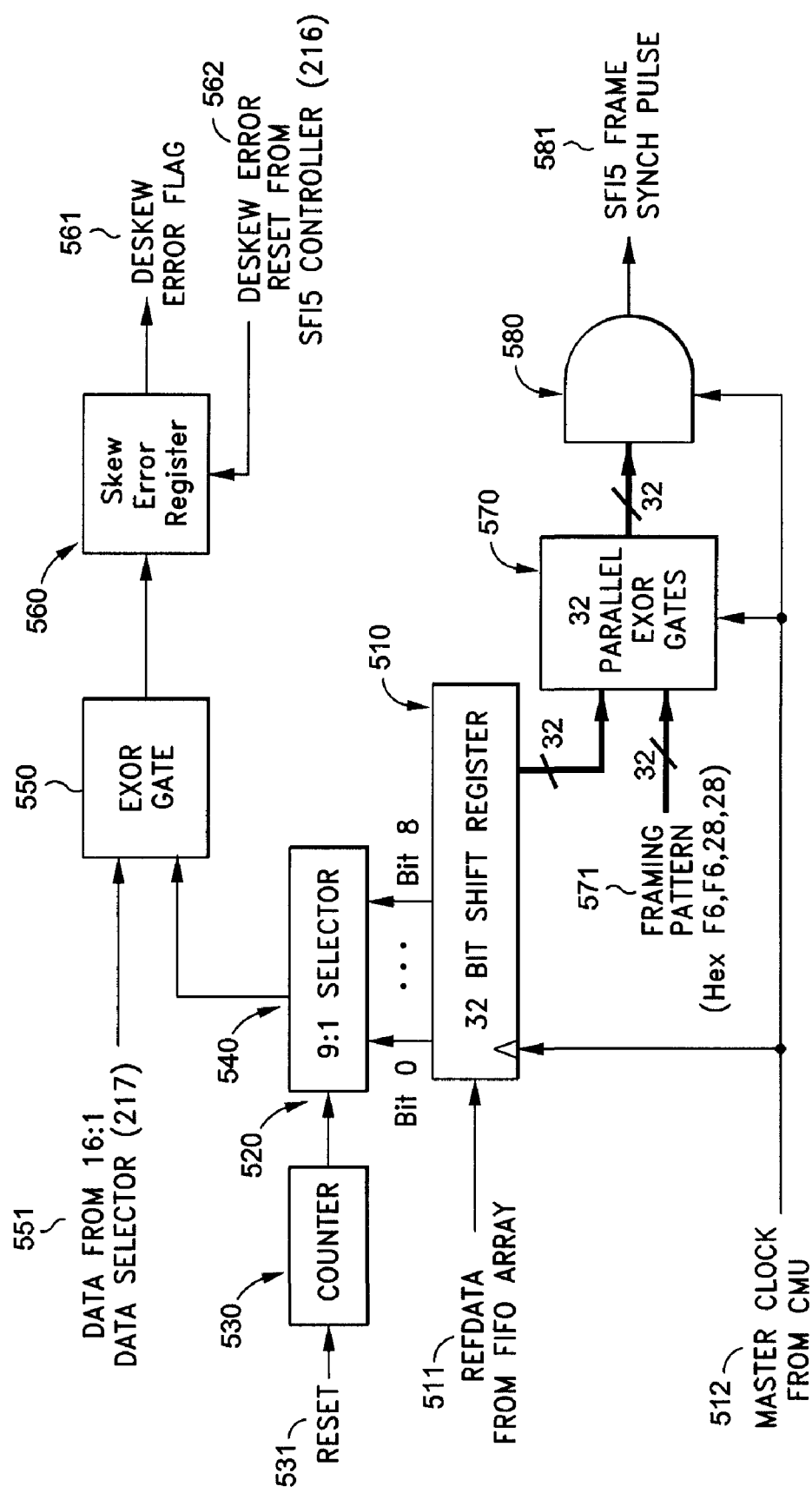
FIG. 5 is a simplified diagram of a deskew correlator in accordance with one embodiment of the present invention.

Now referring to FIG. 5, a simplified diagram of a deskew correlator is shown in accordance with one embodiment of the present invention. A deskew correlator may include a shift register 510, a data selector 520, a counter 530, an exclusive-OR gate 550, a Skew Error register 560, a framing pattern exclusive-OR array 570, and a frame sync AND-gate having 32 inputs 580. The combination of 570 and 580 form a 32-bit parallel correlator which operates on the contents of the 32-bit shift register 510 and the static framing patter 571 resulting in a Frame Sync pulse 581. An incoming signal 511 may be a reference channel signal and an incoming signal 551 may be the output from data selector 217 in FIG. 2.

The output of data selector 217 is sequentially correlated with the output of data selector 520 connected to the reference channel's shift register 510. The data selector 520 selects various delayed copies of the reference channel provided by the FIFO array 212. SFI-5 transmit controller 216 controls the position of this register.

In this fashion, the position of the reference channel relative to the sixteen data channels may be adjusted sequentially until no correlation errors are encountered on all 16 data channels. This deskew process is now described in greater detail.

The deskew alignment process is initiated upon detection of a Transmit Out Of Alignment Alarm (TXOOA) logic-high as provided by the SFI-5 transmit controller 216, in concert with a logic-high on the FRAME_LOCK signal. By fixing the position of reference data selector 520 and sequentially varying the deskew register array delays via each, or any, of the Deskew Enable [N] command lines various alignments of the sixteen data lanes from 213 may be sequentially tested for proper alignment relative to the reference channel 540, using the EXOR gate 550 as described below. If, after all possible positions of each of the counter 430 (in each of the sixteen data lanes of the deskew register array 213) have been attempted without achieving alignment in all of the data lanes from the Deskew Register Array 213, then the position of data selector 520 is advanced by advancing the state of counter 530. Following this, the positions of the counters 430 of the deskew register array 213 are adjusted sequentially until proper alignment of all of the data lanes relative to the selected reference lane 540 is achieved (or not achieved).

Exclusive-OR (EXOR) gate 550 in FIG. 5 compares the selected delayed copy of the reference channel with the selected data channel from 217. Any alignment errors are detected by monitoring the state of the EXOR gate 550 in FIG. 5 over all, or a subset, of the 64 bits in each of the sample data blocks in the reference lane. For example, the output of EXOR gate 550 may be monitored for the presence of alignment errors, as indicated by a logic-high, over 56 of the 64 bits in the reference channel data sample. Any correlation errors detected over these 56 clock cycles would be interpreted by the Deskew Controller 216 as a data alignment error for that particular channel. This would result in a Deskew Enable pulse for that channel, occurring some time after the correlation process, thus advancing the counter 430 corresponding to the data channel that had been selected by 217. Depending upon the particular alignment of the TXDSCP/N input channel relative to the set of data lanes TXDATA[0:15], counter 530 may need to be cycled through any or all of its possible positions (in this case, there are nine possible states for 530). Alternatively, proper data alignment (deskew) may be achieved without modifying the initial value of counter 530. The combination of counter 530 and data selector 520 forms a deskew range expander and enables a wider range of deskew than would be possible with Deskew Register Array 213 alone. When all data channels indicate alignment, the TXOOA signal is placed in the logic-low state, and the data channels are determined to be completely deskewed.

After the deskew operation is complete, the system continually monitors the skew of each data channel in a sequential fashion. TXOOA is placed in the logic-high state if any of the channels are found to be out of alignment, and the deskew process is repeated. Similarly, proper correlation of the framing pattern portion of the reference channel 511 is monitored at each cycle of the reference lane (1088 bits per cycle). If two or more sequential correlation errors are detected, the FRAME_LOCK signal is set to logic-low and which time TXOOA transitions to logic-high. Deskew alignment is not attempted until proper reference frame lock is achieved.

Referring back to FIG. 2, some portions of interface block 210 (e.g., FIFO 212 and, deskew register array 213) may be implemented at a sub-rate (e.g., ⅛ rate). Because digital circuits may not run as fast as analog circuits, some of the digital components are operated in parallel and their outputs multiplexed up to the full-rate. In addition, the FIFO and deskew functions may be compliant with, by way of example and not by way of limitation, the SFI-5 requirements in accordance with one embodiment of the present invention.

Still referring to FIG. 2, in accordance with one embodiment of the present invention, pattern generation and error detecting block 220 may provide a pseudo random word generating function as well as an error checking function which may be performed concurrently with the pseudo random word generating function. It may also check each of the data channels individually or do a word checking operation—i.e., checking all of the data channels (which can be done simultaneously).

Figure 6:
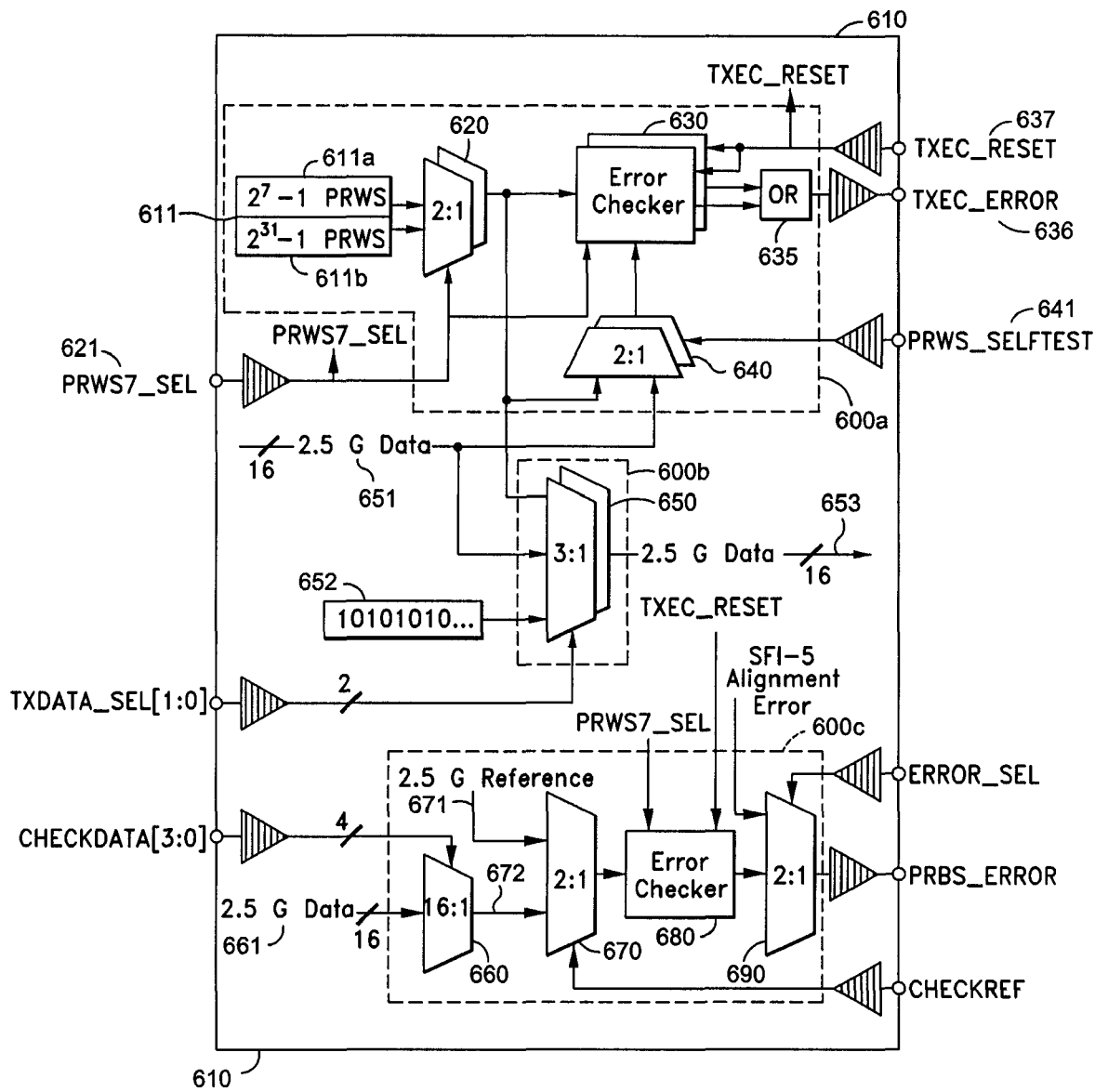
FIG. 6 is a simplified diagram of a pseudo random word generator/error checker in accordance with one embodiment of the present invention.

Now referring to FIG. 6, a simplified diagram of a pattern generation and error detecting block is shown in accordance with one embodiment of the present invention. A pattern generation and error detecting block 610 may include a word checker 600*a*, pass-through circuit 600*b* and an individual lane checker 600*c*. The word checker 600*a* and pass-through circuit 600*b* may operate substantially concurrently.

Still referring to FIG. 6, word checker 600*a* may include a pseudo random word sequence (PRWS) 611, a 2:1 selector 620, an error checker 630, a selector 640, and an OR gate 635. PRWS 611 generates pseudo random words and may be a dual mode PRWS having two separate PRWSes 611*a* and 611*b*. For example, PRWS 611*a* may generate a short pattern (e.g., $2^7-1$ pattern), and PRWS 611*b* may generate a long pattern (e.g., $2^{31}-1$ pattern). A short pattern may look like a typical data pattern and repeat rapidly. A long pattern repeats infrequently (e.g., almost one second before repeating its pattern).

In accordance with one embodiment of the present invention, an error checking operation may occur as follows: Selector 620, which may be 16 deep, will select one of its inputs 611*a* or 611*b*. This selection is determined by a PRWS7_SEL signal 621. The output of selector 620 is sent to error checker 630 (which may be 16 deep) as well as 2:1 selector 640 (which may be 16 deep) and 3:1 selector 650 (which may be 16 deep).

Depending on the PRWS_SELFTEST signal 641, 2:1 selector 640 will either select the PRWS output from selector 620 or the 16 data channels 651. If the PRWS_SELFTEST signal 641 is in the self-test mode, then 2:1 selector 640 will select the PRWS output from selector 620 and injects the PRWS to error checker 630, in which case error checker 630 will receive the same inputs from selector 620 and selector 640.

During a normal test mode, the PRWS_SELFTEST signal 641 is not in the self-test mode, and 2:1 selector 640 will select the 16 data channels 651, in which case error checker 630 will compare the data channels against a PRWS selected by selector 620. Error checker 630 checks for errors in all 16 channels, and the output of error checker 630 is ORed (635). If there is an error in one of the data channels, then the output 636 will be high, and this logic must be cleared by the error reset 637.

Error checker 630 can perform a word checking—i.e., it checks not only whether each channel has the correct pattern, but also whether each channel is aligned correctly relative to the others. The advantage of performing word checking is that all data channels can be checked very quickly as well as simultaneously. If a user checks one channel at a time, then while one channel is checked, there may be an error occurring in the next channel, but such error will not be detected. In the word checking operation, because all of the channels are tested simultaneously, such error will not be missed.

In this example, selector 620, error checker 630, selector 640, and selector 650 are all 16 deep because there are 16 data channels. If the number of data channels changes, these numbers may vary as well.

Still referring to FIG. 6, now pass-through circuit 600*b* is described. Pass-through circuit may include a 3:1 selector 650. 3:1 selector 650 (which is 16 deep in this example) may select any one of the following inputs depending on the value of TXDATA_SEL[1:0]: (i) a PRWS output from selector 620, data channels 651, or a fixed static pattern 652 (e.g., 1 0 1 0 1 0 . . . ). The selected input is outputted at 653. Fixed static pattern 652 is useful for checking logic levels. During a normal operation, the pass-through circuit will simply pass the data channels to its output 653.

Still referring to FIG. 6, an individual lane checking function is described. This function allows a user to find out which data channel contains an error. Lane checker 600*c* may include a 16:1 selector 660, a 2:1 selector 670, an error checker 680, and a 2:1 selector 690. Selector 660 may select an individual data channel from the multiple data channels 661 using the CHECKDATA signal. Selector 670 selects either a reference channel 671 or a data channel 672 selected by selector 660. Error checker 680 is an individual channel error checker, checking for an error in an individual channel outputted by selector 670. Error checker 680 is, by way of example but by way of limitation, a self-synchronizing error checker. If an error is detected by word checker 600a, then it may be useful to find out whether the error is coming from one specific channel. The individual lane checking function is useful in such situation.

The error detecting block of the present invention can be used to check if a chip (e.g., a serializer chip 200) is working properly and to perform a transponder test and/or a system test. It can check for, among others, system noise quality, intermittent problems, connections, and problems with any preceding components (e.g., if the error detecting block is part of a serializer, then the error detecting block can check, for instance, the fiber and TIA). The error detecting block of the present invention also allows a user to find out whether one or a few of the data channels are corrupted because of problems associated with those particular channels (e.g., wiring, solder joint, interconnect). One of the advantages of having the error detecting block is that a user does not need to connect to the massive number of data channels or buy a complex test system to perform these tests. A pattern generation and error detecting circuit of the present invention may be utilized not only in serializers/deserializers but also in other circuits.

Figure 7:
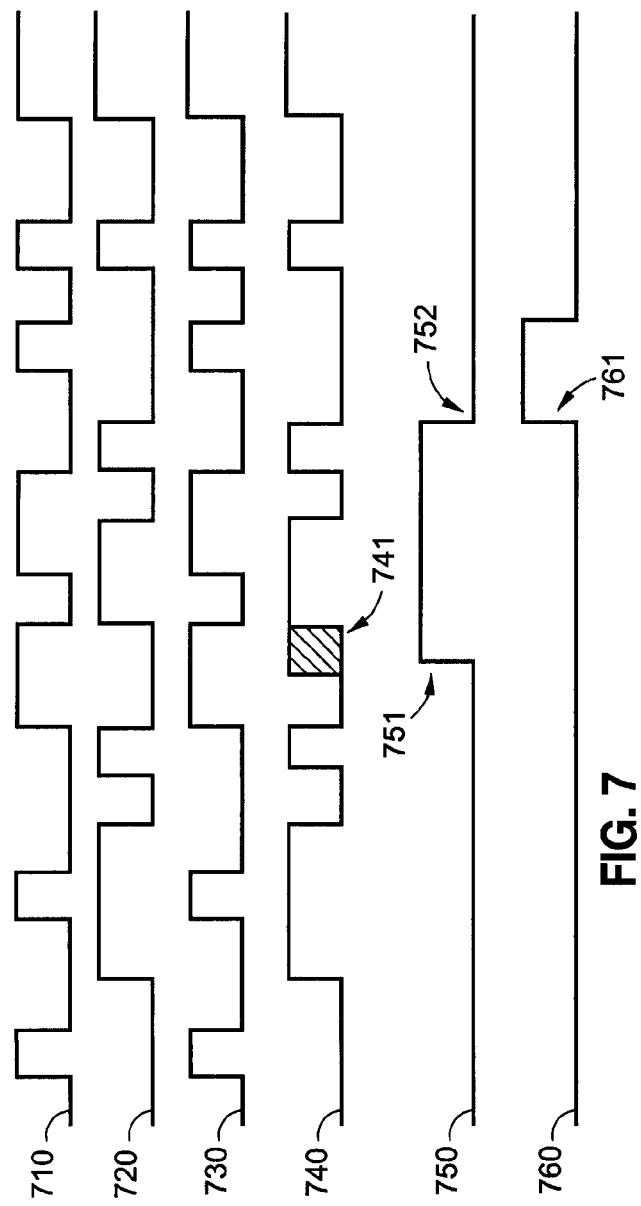
FIG. 7 illustrates exemplary waveforms of signals produced in a pseudo random word sequence generator/error checker.

Now referring to FIGS. 6 and 7, exemplary waveforms of signals produced in a pseudo random word sequence generator/error checker are illustrated in accordance with one embodiment of the present invention. In this example, selector 620 may select a PRWS from either 611a or 611b. The PRWS may have 16 channels. A signal 710 may be a PRWS [15] signal coming out of selector 620 in FIG. 6. A signal 720 may be a PRWS[0] signal coming out of selector 620. Data channels 651 may consist of 16 channels. A signal 730 may be a data channel[15] signal. A signal 740 may be a data channel [0] signal. Signal 730 may be checked against signal 710. Signal 740 may be checked against signal 720. A bit 741 will produce an error at the output 636.

A signal 750 may be a signal at TXEC_ERROR 636. A signal 760 may be a signal at TXEC_RESET 637. When a word error is detected, signal 750 goes high (751), and is later reset (752) by the reset signal 761.

Figure 8:
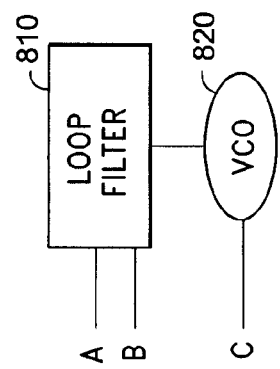
FIG. 8 is a simplified diagram of a portion of a clock clean-up loop in accordance with one embodiment of the present invention.

Now referring to FIGS. 2 and 8, reference selector block 250 is described in detail. Reference selector 250 may select a reference clock and clean up the signal. It includes a phase locked loop, locks to the reference clock and cleans the signal in terms of its phase-to-noise performance. A reference select matrix 251 allows a user to select one of the three sources: REFCLK_AP/N, REFCLK_BP/N, or DCLK. In a typical application, one of these signals may come from a system reference, one may come from an accompanying deserializer chip, and one may come from the framer. A selected reference clock can be either directly routed to CMU 230 or pass through a clock clean-up loop (or a filter loop). The clock clean-up loop may include an on-chip component phase/frequency detector 252 and off-chip components that may include a loop filter 810 and a low phase noise voltage controlled oscillator (VCO) 820 shown in FIG. 8.

If the direct route is selected, then the selected reference clock is sent to CMU 230 which multiplies the clock to a higher frequency (e.g., about 20 GHz). If the clean-up loop path (i.e., a filtered version of the selected reference clock) is selected, then the selected reference clock is routed to phase/frequency detector 252 where it is compared to VCO 820 resulting in differential signals PHSERR_UPP/N (A) and PHSERR_DNP/N (B). These signals would be supplied to an off-chip loop filter 810.

Referring to FIG. 2, bit inversion circuit 261 may be used to invert the data stream output received from pattern generation and error detecting block 220. Mux 260 may include, by way of example and not by way of limitation, a 16:2 multiplexer for multiplexing 16 channels into 2 channels. A pre-driver 270 (e.g., pre-driver 109 in FIG. 1) may include a 2:1 multiplexer 271 and an output stage 272 and may be integrated into the serializer chip 200 in accordance with one embodiment of the present invention. In another implementation, a Mux may include one 16:1 multiplexer in which case a pre-driver may include just an output stage. Alternatively, some other division of multiplexers may be utilized (e.g., 16:4 then 4:1; 16:8, 8:4 then 4:1). A selector 240 may select either (i) a DCLKX4 signal 233 which is derived from a TXDCKP/N signal 219a generated by a framer or (ii) a CMU signal 232 generated by CMU 230. The output signal of selector 240 may be supplied to, among others, deskew register array 213, FIFO 212, and selector 219d.

In FIG. 2, when serializer 200 operates in a SONET/OC-768 system, in accordance with one embodiment of the present invention, the data rate of the 16 data channels in interface block 210 may be about 2.5 Gbps. The data rate of the 16 data channels in pattern generation and error detecting block 220 may be still about 2.5 Gbps. After the data channels pass through the 16:2 Mux 260, there may be two data channels, and the data rate may be about 20 Gbps. After passing through the 2:1 Mux 271, there may be one data channel, and the data rate may be about 40 Gbps.

Figure 9B:
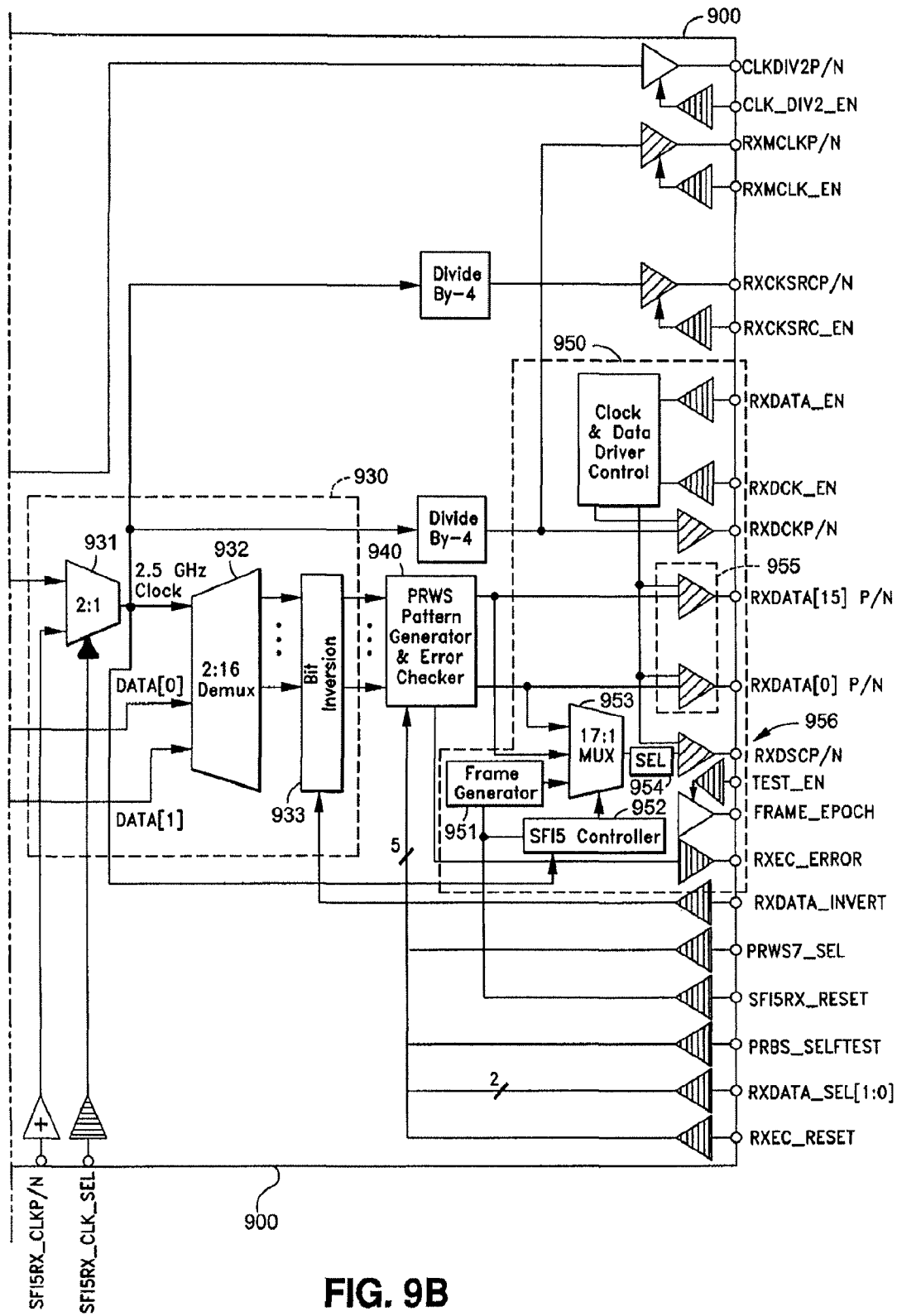
FIG. 9 is a simplified diagram of a deserializer in accordance with one embodiment of the present invention.

Now referring to FIG. 9, a functional block diagram of a deserializer is shown in accordance with one embodiment of the present invention. The term deserializer may be used to refer to, by way of example and not by way of limitation, (i) a demultiplexer, (ii) a combination of a clock and data recovery unit and a demultiplexer, (iii) more broadly, a combination of a clock and data recovery unit, a demultiplexer and an interface unit, or (iv) a combination of a receiver block, a clock and data recovery unit, a demultiplexer and an interface unit.

In FIG. 9, a deserializer chip may include, by way of example and not by way of limitation, the following features in accordance with one embodiment of the present invention:

SONET OC-768 1:16 CDR/Demultiplexer
  39.8 to 43.5 Gbps Ground-Referenced Serial Primary and Auxiliary Input Ports
SFI-5 Compatible Data and Clock Interfaces (OIF2001.145.10 and OIF2001.149.13)
On-Chip Clock and Data Recovery Unit (CDR) with Half-Rate Clock Output
CDR Lock Status Indicator
Input Signal Level Detector
On-Chip PRWS Error Checker and Pattern Generator: $2^7-1$ and $2^{31}-1$ patterns
40 mVp-p Input Sensitivity
Adjustable Input Threshold and Sample Clock Phase
User Selectable Reference Clock Inputs: 622, 1244, or 2488 MHz
Control Interfaces Support Wide Range of Logic Families 1.2V, 1.8V, or 3.3V LVCMOS
Temperature Sense Output Voltage
Low Power Consumption: 3.1 Watts (typical)

In accordance with one embodiment of the present invention, a deserializer may accept single-ended or differential 39.8 to 43.5 Gbps NRZ serial data streams from either of two user-selectable input ports and may demultiplex the data into sixteen parallel output channels along with a reference channel consistent with the SFI-5 standard. The parallel outputs may be 1.2V CML-compatible differential data pairs and may be fully compliant with the SFI-5 interface standard defined in OIF2001.145.10 and OIF2001.149.13. Deserializer 900 may support DC coupling with 1.2V $V_{dd}$ or AC coupling with 1.8V $V_{dd}$. An integrated CDR circuit, featuring an on-chip VCO, recovers the incoming clock and data for demultiplexing. A user-enabled half-rate recovered clock output is available. The differential input signal and high-speed clock outputs may be 50 ohm ground-referenced interfaces.

The chip features control lines for adjustment of both input DC threshold and sample clock phase allowing performance optimization for a wide range of signal types and channel conditions. Input sensitivity may be as low as 40 mVp-p (differential or single-ended). A frequency-selectable external reference clock may provide 622, 1244, or 2488 MHz. The device may require a negative supply voltage of −3.6 Volts and two positive supply voltages, each operating at a nominal voltage of 1.2 Volts. The positive power supplies may be independently varied to comply with the interface levels associated with a host system. A deserializer chip may be packaged into, by way of example and not by way of limitation, a 5000 microns (length) by 5000 microns (width) by 500 microns (thickness) die.

In FIG. 9, in accordance with one embodiment of the present invention, a deserializer 900 may be an integrated circuit (e.g., one semiconductor chip), including an input receiver block 910, a clock and data recovery (CDR) block 920, a demultiplexing stage 930, an pattern generation and error detecting block 940, and an interface block 950.

Input receiver block 910 may include, by way of example and not by way of limitation, a LOS detector 911, a peak detector 912, a threshold adjust block 913 and a limiting amplifier 914 in accordance with one embodiment of the present invention. Input receiver block 910 may receive an input data signal and condition it by, among others, amplifying it and adjusting the differential offset.

A data signal (e.g., at about 40 Gbits/sec) may flow in through RXDATAINP/N. The signal may be, by way of example and not by way of limitation, a differential signal. The input signal may go through a threshold adjust block 913 and a limiting amplifier 914. Threshold adjust block 913 may adjust the differential offset. A control loop may be included so that an output differential offset voltage may be detected and fed back to the input through a loop filter function to provide a correction. When configured to operate in this closed-loop servo mode, TH_ADJ 917 provides an offset value for the detected differential offset error voltage (as detected by the Differential Offset Sense block in FIG. 9). Input receiver block 910 may also receive a phase adjust signal 916.

If EXTLOS_SEL is at logic-low, LOS (Loss of Signal) detector 911 may compare an analog voltage originating from LOS_TH against another analog voltage from Peak Detector 912 and output a digital LOS signal that goes into a status control logic 915. If EXTLOS_SEL is at logic-high, the digital signal described above is replaced by EXTLOS. Peak detector 912 may look for a peak-to-peak voltage that goes into CDR block 920 and may produce an analog voltage proportional to the peak-to-peak voltage.

Figure 10:
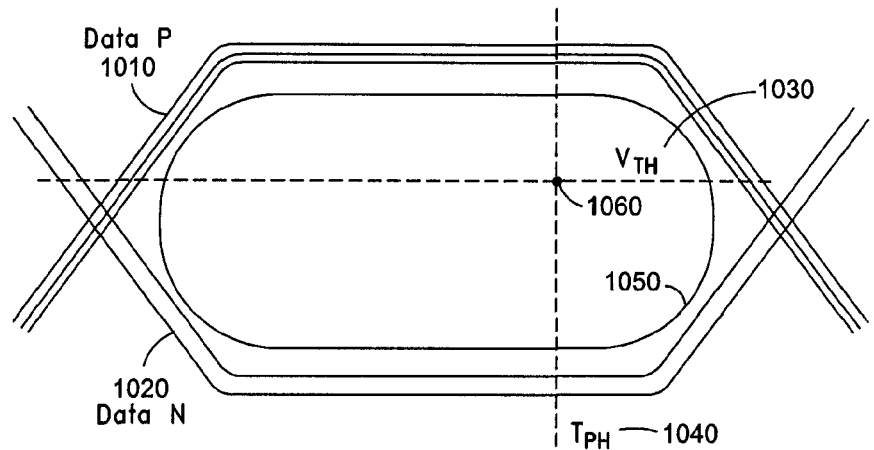
FIG. 10 illustrates an exemplary eye mask measurement.

Now referring to FIGS. 9 and 10, an exemplary eye mask measurement is illustrated in accordance with one embodiment of the present invention. Eye mask measurements can be performed by tweaking the threshold adjust signal 917 and the phase adjust signal 916 in FIG. 9. In this example, an input data stream may look like Data P 1010 and Data N 1020. They are a family of signals. One can set the threshold adjust Vth 1030 and the phase adjust Tph 1040. At a particular point in time (1060), a decision is made whether the data is 1 or 0. By moving Vth 1030 and Tph 1040, one can trace out a contour 1050 which shows how good a signal is at a sampler. This is a function of many factors such as, by way of example and not by way of limitation, the input from the fiber, the fiber quality, chromatic dispersion, polarization mode dispersion, the quality of various components in the signal path (e.g., an optical amplifier, a photo detector, optics, a TIA, a post amplifier). All of these may close up the contour.

Referring back to FIG. 9, CDR block 920 may lock a VCO to the data signal and recover a clock signal. It may sample the data, demultiplex it by two, and output two data signals DATA [0] and DATA[1] at a half rate (e.g., about 20 Gbits per second). In another embodiment, CDR block 920 may output one data channel or more than two data channels. More discussions regarding a CDR may be found in patent applications entitled, "Multi-Gigabit-Per-Sec Clock Recovery Apparatus and Method for Optical Communications" (U.S. patent application Ser. No. 09/895,955; PCT international application number PCT/US 02/20,569) and "Quadrature Ring Oscillator" (U.S. patent application Ser. No. 10/115,400).

In FIG. 9, demultiplexing stage 930 may include, by way of example and not by way of limitation, a clock selector 931, a 2:16 demultiplexer 932, and a bit inversion 933 in accordance with one embodiment of the present invention. Clock selector 931 may select a clock generated by CDR block 920 or an external clock (e.g., about 2.5 GHz). Demultiplexer 932 may demultiplex the two data lanes received from CDR block 920 into sixteen data channels. In another implementation, Demultiplexer 932 may utilize a different number of demultiplexers (e.g., four 2:4 demultiplexers rather than one 2:16 demultiplexer, one 1:16 demultiplexer). Bit inversion 933 may flip the polarity. For example, a "P" input (a non-inverted input) may become an "N" input (an inverted input), and an "N" input may become a "P" input.

Figure 11:
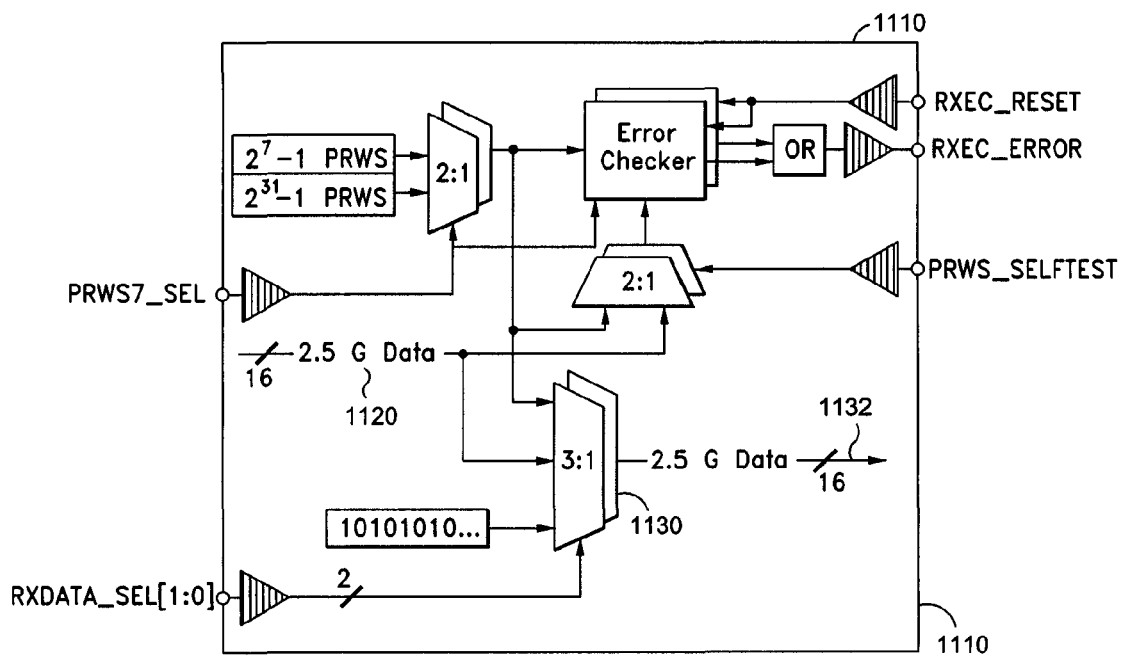
FIG. 11 is a simplified diagram of a pseudo random word sequence generator/error checker in accordance with one embodiment of the present invention.

Now referring to FIG. 11, a simplified diagram of pattern generation and error detecting block 940 in FIG. 9 is shown in accordance with one embodiment of the present invention. The pattern generation and error detecting block 1110 shown in FIG. 11 is similar to the pattern generation and error detecting block 610 shown in FIG. 6, except that the pattern generation and error detecting block 1110 does not include an individual lane checker such as checker 600c shown in FIG. 6. During a normal operation, a 3:1 selector 1130 simply selects data 1120 and outputs it (1132).

Referring back to FIG. 9, interface block 950 is described in detail in accordance with one embodiment of the present invention. Interface block 950 may be a Receive SFI-5 interface circuit. Interface block 950 may include, by way of example and not by way of limitation, a framer generator 951, a SFI-5 controller 952, a 17:1 multiplexer 953, an output stage 955 and a clock & data driver control. Interface block 950's function includes, by way of example and not by way of limitation, (a) creating a reference channel RXDSCP/N 956 from the multiple data channels and a reference frame and (b) buffering the data channels so that they are compatible with the interface (e.g., SFI). The reference channel consists of four framing bytes, four bytes of expansion header, and sixteen data channels.

In this example, to create a reference channel, multiplexer 953 receives (a) multiple (e.g., 16) data channels coming out of pattern generation and error detecting block 940 and (b) a reference frame generated by frame generator 951. Multiplexer 953 may run at, for example, about 2.5 Gbits/sec and is controlled by SFI-5 controller 952. In another implementation, a word reorder may be included (e.g., between pattern generation and error detecting block 940 and output stage 955).

Figure 12:
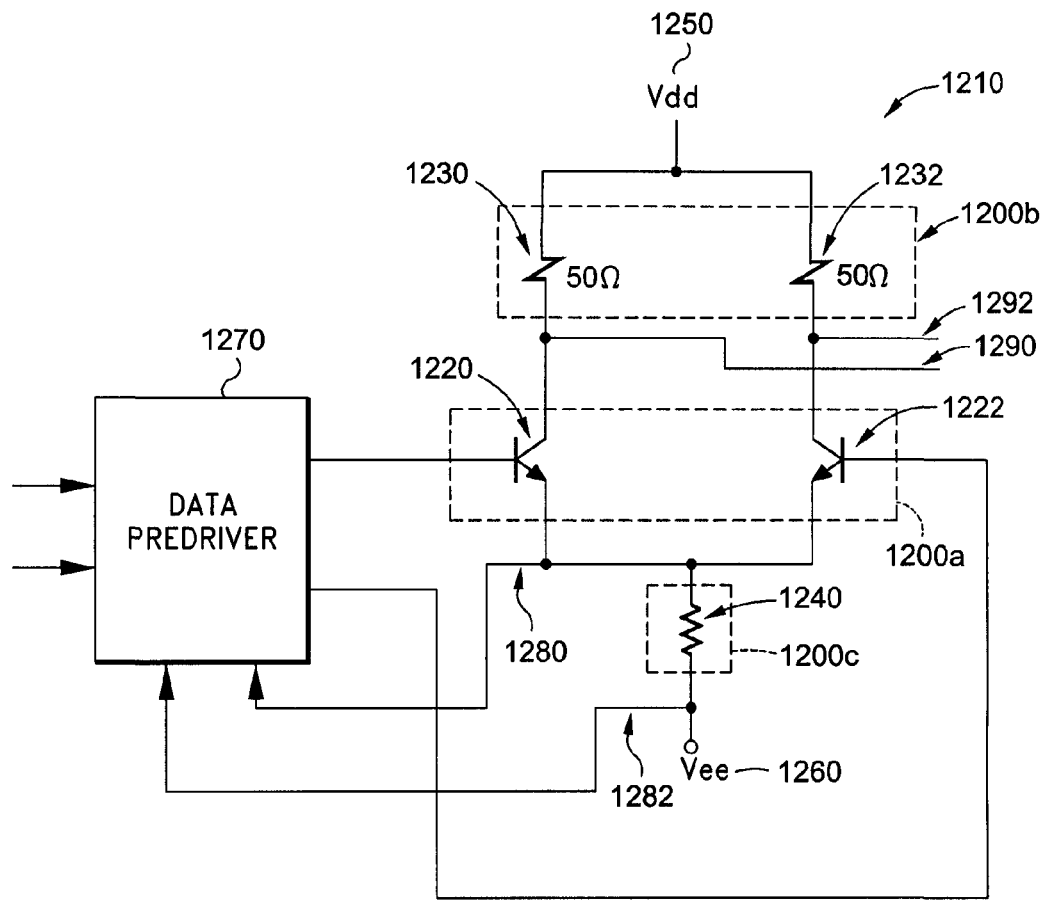
FIG. 12 illustrates a simplified diagram of an output stage of a deserializer in accordance with one embodiment of the present invention.

Now referring to FIG. 12, output stage 955 of FIG. 9 is described in detail in accordance with one embodiment of the present invention. An output stage 1210 shown in FIG. 12 can produce a stable output swing while minimizing power consumption. Output stage 1210 may include, by way of example and not by way of limitation, an input circuit 1200a, an output load 1200b (active or passive), a current source/sink 1200c (active or passive), and a data pre-driver 1270. The outputs are shown at 1290 and 1292. In accordance with one embodiment of the present invention, input circuit 1200a may be, by way of example and not by way of limitation, a differential pair of bipolar transistors 1220 and 1222; output load 1200b may be, by way of example and not by way of limitation, a pair of resistors 1230, 1232 (e.g., 50 ohm resistors); and current source/sink 1200c may be, by way of example and not by way of limitation, a resistor 1240. Vdd 1250 may be at 1.2V. Vee 1260 may be at 0V. The present invention is not limited to the exact configuration shown in FIG. 12.

In FIG. 12, data channels come in through data pre-driver 1270. When Vdd 1250 is close to Vee 1260, the voltage drop across current source/sink 1200c may become very small in order to provide adequate voltage drop across the transistors 1220, 1222. What is needed is varying voltage to capture varying transistor characteristics over temperature and process. Voltage sense lines 1280, 1282, which monitor the voltage across the current source/sink 1200c, are fed back to data pre-driver 1270. The output voltage of data pre-driver 1270 is adjusted to stabilize the current through the current source/sink 1200c. The loop created by data pre-driver 1270 and current source/sink 1200c stabilizes the output swing at 1290 and 1292. This technique saved more than 1 W in power consumption.

Referring back to FIG. 9, when deserializer 900 operates in a SONET/OC-768 system, in accordance with one embodiment of the present invention, the data rate of the input data may be about 40 Gbps. After passing through CDR block 920, now there may be two data channels—DATA[0] and DATA[1], and the data rate may be about 20 Gbps. After passing through 2:16 Demux 932, there may be 16 data channels, and the data rate may be about 2.5 Gbps. Each of the pattern generation and error detecting block 940 and interface block 950 operates on 16 data channels, and the data rate of the 16 data channels may be about 2.5 Gbps.

In accordance with one embodiment of the present invention, various components in FIG. 2 may be, by way of example and not by way of limitation, the following types of devices. Interface circuit 210 may be mostly CMOS devices. Pattern generation and error detecting block 220 may be mostly CMOS devices. Mux 260 may be mostly bipolar devices where bit inversion block 261 may include mostly CMOS devices. CMU 230 may be mostly bipolar devices. Reference selector 250 may be mostly bipolar devices. A word reorder may be mainly bipolar devices.

In accordance with one embodiment of the present invention, various components in FIG. 9 may be, by way of example and not by way of limitation, the following types of devices. Input receiver block 910 may be mostly bipolar devices. CDR block 920 may be mostly bipolar devices. Demultiplexing stage 930 may be mostly BiCMOS devices. Pattern generation and error detecting block 940 may be mostly CMOS devices. Interface block 950 may be mostly BiCMOS devices. Output stage 955 may be mostly bipolar devices. By using more CMOS devices and reducing the number of stages, one may achieve lower power consumption.

In accordance with one embodiment of the present invention, the serializer in FIG. 2 may be packaged as a flip chip (such as a ball grid array or BGA) to provide better isolation. This eliminates inductance associated with wire bonds. Wire bonds also may act like antennas and tend to cause signals to be coupled. Flip chips reduce signal coupling. Flip chips are also capable of providing power and ground contacts anywhere (e.g., in the middle of the chip) instead of being limited to the periphery of the chip. Flip chip packages are discussed in more detail in patent applications entitled, "Connection Package for High-Speed Integrated Circuit," (U.S. patent application Ser. No. 09/990,144; PCT international application number PCT/US 02/37586) and "Single and Multiple Layer Packaging of High-Speed/High-Density ICs" (U.S. patent application Ser. No. 09/990,247; PCT international application number PCT/US 02/37588).

Proper isolation of power and ground is important to high-peed integrated chips. Both lateral isolation as well as vertical isolation (e.g., putting power and ground in different layers of a package) are beneficial. Also, not combining certain power and ground until either the package level or the mother board level is helpful. For example, a voltage controlled oscillator (VCO) for CMU 230 in FIG. 2 is a sensitive part of the chip. It has its own dedicated power and ground. These are isolated through the package. In accordance with one embodiment of the present invention, power and ground may be, by way of example and not by way of limitation, divided up in the following manner: At the mother board level, a common ground may be split into a VCO ground, an analog ground and a digital ground. A negative power supply may be split into a VCO power, an analog power, and a digital power. At a chip level, there may be clusters of separate analog power supplies and digital power supplies and many different grounds.

While the present invention has been particularly described with reference to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention. For example, while references are made to the OC-768 optical transmission, particularly to SFI-5, the invention is not limited to the OC-768/STM-256 transmission or SFI-5. While BGA connectors are described, the invention may utilize other connectors including, without limitation, pin grid array ("PGA") connectors, and other surface mount connectors. It should be also noted that the invention may be utilized in wired or wireless applications. While the present invention may utilize a BiCMOS technology, it is not limited to that technology. It may be possible to implement the invention in other technologies including without limitation bipolar transistor, CMOS, FET (e.g., MOSFET, MESFET, JFET), HBT, or HEMT technology or some combination thereof. While the invention may be manufactured using a Si—Ge technology, it may be made using other materials, including without limitation, other semiconductor materials including without limitation silicon or III-V materials (e.g., InP, GaAs, InGaAs, GaN). While certain frequencies have been referenced as an illustration, the invention is not limited to those frequencies. While certain data rates (e.g., 39.8 to 43.5 Gbps, 2.488 Gbps, 2.72 Gbps) have been described to illustrate the use of the present invention in conjunction with SFI-5 systems, these are not limitations, and the present invention may utilize other data rates. In addition, the invention can be applied to both digital and analog applications.

What is claimed is:

1. A deserializer comprising:
   an input receiver circuit for receiving an input data signal and for adjusting said input data signal, said input receiver circuit comprising:

a threshold adjust block for receiving said input data signal and a threshold adjust signal;

a limiting amplifier coupled to said threshold adjust block, said limiting amplifier for receiving an output of said threshold adjust block and amplifying said output of said threshold adjust block;

an offset sense block coupled to said threshold adjust block and said limiting amplifier, said offset sense block for receiving said threshold adjust signal and an output of said limiting amplifier and for feeding an output of said offset sense block to said threshold adjust block, wherein said threshold adjust block, said limiting amplifier and said offset sense block form a feedback control loop;

a peak detector coupled to said offset sense block, said peak detector for detecting a peak-to-peak signal of said output of said limiting amplifier; and a loss-of-signal detector coupled to said peak detector, said loss-of-signal detector for comparing an output of said peak detector with a threshold signal;

a clock and data recovery circuit (CDR) coupled to said input receiver circuit, said CDR for recovering clock and data signals;

a demultiplexing circuit coupled to said CDR, said demultiplexing circuit for receiving one or more data channels from said CDR and splitting said one or more data channels into a first set of data channels;

a serdes framer interface (SFI) circuit coupled to said demultiplexing circuit, said SFI circuit for generating a reference channel, for generating a second set of data channels based on said first set of data channels, and for sending said second set of data channels and said reference channel to a framer, wherein said one or more data channels have less number of channels than said first set of data channels, wherein a data rate of said one or more data channels is higher than a data rate of said first set of data channels.

2. The deserializer of claim 1, further comprising:

a pseudo random pattern generator and error checker (PR) circuit coupled to said demultiplexing circuit and said SFI circuit, said PR circuit for generating a pseudo random pattern and for performing error checking.

3. The deserializer of claim 1, wherein a data rate of said second set of data channels is about 2.5 gigabits per second.

4. The deserializer of claim 1 further including:

ground-referenced serial primary and auxiliary input ports.

5. The deserializer of claim 1, further comprising:

a status control logic coupled to said loss-of-signal detector, said status control logic for receiving a digital output signal from said loss-of-signal detector; and a lock detect circuit coupled to said CDR and said status control logic, wherein data and clock interfaces are SFI-5 compatible, wherein said threshold adjust signal for said threshold adjust block is an analog signal, said peak-to-peak signal is a voltage, said output of said peak detector is an analog signal, said threshold signal for said loss-of-signal detector is an analog signal.

6. The deserializer of claim 1, wherein said CDR is for producing a half-rate clock output.

7. The deserializer of claim 1, wherein said deserializer is for providing input sensitivity lower than 50 mV peak-to-peak.

8. The deserializer of claim 1, wherein said CDR includes a threshold adjust port for adjusting an input threshold and a phase adjust port for adjusting a sample clock phase.

9. The deserializer of claim 1, further comprising:

a plurality of user-selectable reference clock inputs, wherein said SFI circuit comprises:

a frame generator for generating said reference channel;

a multiplexer coupled to said frame generator, said multiplexer for generating a reference channel based on multiple data channels and said reference channel;

an SFI controller coupled to said frame generator and said multiplexer, said SFI controller for controlling said frame generator and said multiplexer, said SFI controller for sharing a clock signal used by said demultiplexing circuit;

an output stage block coupled to said demultiplexing circuit; and a clock an data driver control block coupled to said output stage block, wherein said output stage block comprises:

a data pre-driver block for receiving data channels;

an input circuit coupled to said data pre-driver;

an output load coupled to said input circuit for generating said second set of data channels; and a current source-sink circuit coupled to said data pre-driver block and said input circuit, wherein said current source-sink circuit and said data pre-driver block form a second feedback control loop for stabilizing a current through said current source-sink circuit and stabilizing an output swing of said output load.

10. The deserializer of claim 1, wherein said deserializer is for having power consumption of not more than 4 watts during operation.

11. An integrated circuit comprising:

an input receiver circuit for receiving an input data signal and for adjusting said input data signal, said input receiver circuit comprising:

a threshold adjust block for receiving said input data signal and a threshold adjust signal;

a limiting amplifier coupled to said threshold adjust block, said limiting amplifier for receiving an output of said threshold adjust block and amplifying said output of said threshold adjust block;

an offset sense block coupled to said threshold adjust block and said limiting amplifier, said offset sense block for receiving said threshold adjust signal and an output of said limiting amplifier and for feeding an output of said offset sense block to said threshold adjust block, wherein said threshold adjust block, said limiting amplifier and said offset sense block form a feedback control loop;

a peak detector coupled to said offset sense block, said peak detector for detecting a peak-to-peak signal of said output of said limiting amplifier; and a loss-of-signal detector coupled to said peak detector, said loss-of-signal detector for comparing an output of said peak detector with a threshold signal;

a demultiplexing circuit for receiving one or more data channels and splitting said one or more data channels into a first set of data channels;

a serdes framer interface (SFI) circuit coupled to said demultiplexing circuit, said SFI circuit for generating a reference channel, for generating a second set of data channels based on said first set of data channels, and for sending said second set of data channels and said reference channel to a framer, wherein said one or more data channels have less number of channels than said first set of data channels, wherein a data rate of said one or more data channels is higher than a data rate of said first set of data channels, wherein said demultiplexing circuit and said SFI circuit are integrated into one semiconductor chip.

12. The integrated circuit of claim 11, further comprising:
a clock and data recovery circuit (CDR) coupled to said demultiplexing circuit, said CDR for recovering clock and data signals, wherein said CDR is integrated into said one semiconductor chip.

13. The integrated circuit of claim 12, further comprising:
a limiting amplifier coupled to said CDR, wherein said limiting amplifier is integrated into said one semiconductor chip.

14. The integrated circuit of claim 13, further comprising:
a trans-impedance amplifier coupled to said limiting amplifier, said trans-impedance amplifier for converting a current signal into a voltage signal, wherein said trans-impedance amplifier is integrated into said one semiconductor chip.

\* \* \* \* \*